United States Patent
Ishikawa et al.

(10) Patent No.: US 12,253,825 B2
(45) Date of Patent: Mar. 18, 2025

(54) FERRITE PARTICLES, ELECTROPHOTOGRAPHIC DEVELOPER CARRIER CORE MATERIAL, ELECTROPHOTOGRAPHIC DEVELOPER CARRIER, AND ELECTROPHOTOGRAPHIC DEVELOPER

(71) Applicant: POWDERTECH CO., LTD., Kashiwa (JP)

(72) Inventors: Makoto Ishikawa, Chiba (JP); Tetsuya Uemura, Chiba (JP)

(73) Assignee: POWDERTECH CO., LTD., Kashiwa (JP)

( * ) Notice: Subject to any disclaimer, the term of this patent is extended or adjusted under 35 U.S.C. 154(b) by 602 days.

(21) Appl. No.: 17/433,593

(22) PCT Filed: Feb. 20, 2020

(86) PCT No.: PCT/JP2020/006870
§ 371 (c)(1),
(2) Date: Aug. 24, 2021

(87) PCT Pub. No.: WO2020/175326
PCT Pub. Date: Sep. 3, 2020

(65) Prior Publication Data
US 2022/0155702 A1    May 19, 2022

(30) Foreign Application Priority Data
Feb. 25, 2019   (JP) .................................. 2019-031162

(51) Int. Cl.
G03G 9/107   (2006.01)
C01G 49/00   (2006.01)
(Continued)

(52) U.S. Cl.
CPC ....... *G03G 9/1085* (2020.08); *C01G 49/0018* (2013.01); *C01G 49/06* (2013.01);
(Continued)

(58) Field of Classification Search
CPC ........................... G03G 9/1085; G03G 9/1132
See application file for complete search history.

(56) References Cited

U.S. PATENT DOCUMENTS 5,190,841 A    3/1993   Saha et al.
5,190,842 A *  3/1993   Saha .................... G03G 9/1075
                                                252/62.63
(Continued)

FOREIGN PATENT DOCUMENTS

CN    1768307 A      5/2006
CN    103430105 A    12/2013
(Continued)

OTHER PUBLICATIONS

English machine translation of the description of JP-2015212788-A (Year: 2015).*
(Continued)

*Primary Examiner* — Peter L Vajda
*Assistant Examiner* — Boone Alexander Evans
(74) *Attorney, Agent, or Firm* — Foley & Lardner LLP

(57) ABSTRACT

The present invention relates to a ferrite particle, containing a crystal phase component containing a perovskite crystal represented by the compositional formula:
$RZrO_3$ (provided that R represents an alkaline earth metal element), and having an apparent density in a range represented by the following formula:

$1.90 \leq Y \leq 2.45$ provided that Y in the formula is the apparent density $(g/cm^3)$ of the ferrite particle.

10 Claims, 1 Drawing Sheet

(51) Int. Cl.
*C01G 49/06* (2006.01)
*G03G 9/113* (2006.01)
*H01F 1/34* (2006.01)
*H01F 1/36* (2006.01)

(52) U.S. Cl.
CPC .......... *G03G 9/1132* (2013.01); *H01F 1/344* (2013.01); *H01F 1/36* (2013.01); *C01P 2006/12* (2013.01)

(56) References Cited

U.S. PATENT DOCUMENTS

| | | | |
|---|---|---|---|
| 5,595,850 | A | 1/1997 | Honjo et al. |
| 7,442,483 | B2 * | 10/2008 | Kobayashi ........... G03G 9/1085 430/111.3 |
| 2004/0185366 | A1 | 9/2004 | Shinmura et al. |
| 2006/0003248 | A1 | 1/2006 | Kobayashi et al. |
| 2006/0199093 | A1 | 9/2006 | Iinuma et al. |
| 2011/0111337 | A1 | 5/2011 | Horie et al. |
| 2011/0212399 | A1 * | 9/2011 | Suwa ................... G03G 9/1075 430/111.32 |
| 2012/0129087 | A1 | 5/2012 | Iwami et al. |
| 2013/0011780 | A1 | 1/2013 | Kawauchi et al. |
| 2013/0171558 | A1 | 7/2013 | Suwa et al. |
| 2016/0026105 | A1 | 1/2016 | Tsurumi et al. |
| 2017/0139338 | A1 * | 5/2017 | Nakamura ........... C09D 133/10 |
| 2018/0008966 | A1 | 1/2018 | Aga et al. |
| 2018/0046103 | A1 * | 2/2018 | Kamai ................. G03G 9/1136 |
| 2019/0079422 | A1 | 3/2019 | Sugiura et al. |
| 2020/0026211 | A1 | 1/2020 | Sawamoto et al. |

FOREIGN PATENT DOCUMENTS

| | | | |
|---|---|---|---|
| CN | 107207279 | A | 9/2017 |
| EP | 0 351 940 | A2 | 1/1990 |
| EP | 1 612 612 | A2 | 1/2006 |
| JP | S63-69717 | A | 3/1988 |
| JP | H01-291406 | A | 11/1989 |
| JP | H05-343213 | A | 12/1993 |
| JP | 3243376 | B2 | 1/2002 |
| JP | 2006-017828 | A | 1/2006 |
| JP | 3872025 | B2 | 1/2007 |
| JP | 2011-028060 | A | 2/2011 |
| JP | 2011-118380 | A | 6/2011 |
| JP | 5129079 | B2 | 1/2013 |
| JP | 5352729 | B2 | 11/2013 |
| JP | 2015212788 | A * | 11/2015 |
| JP | 5850331 | B2 | 2/2016 |
| JP | 2017-151133 | A | 8/2017 |
| JP | WO2017/175646 | A1 | 2/2019 |
| WO | WO-2018/147002 | A1 | 8/2018 |

OTHER PUBLICATIONS

International Searching Authority, "International Search Report," issued in connection with International Patent Application No. PCT/JP2020/006870, dated Apr. 21, 2020.

International Searching Authority, "Written Opinion," issued in connection with International Patent Application No. PCT/JP2020/006870, dated Apr. 21, 2020.

Zhu, Jian Guo, "Electronic and Optoelectronic Materials", National Defence Industry Press, Aug. 31, 2007, pp. 96-98.

* cited by examiner

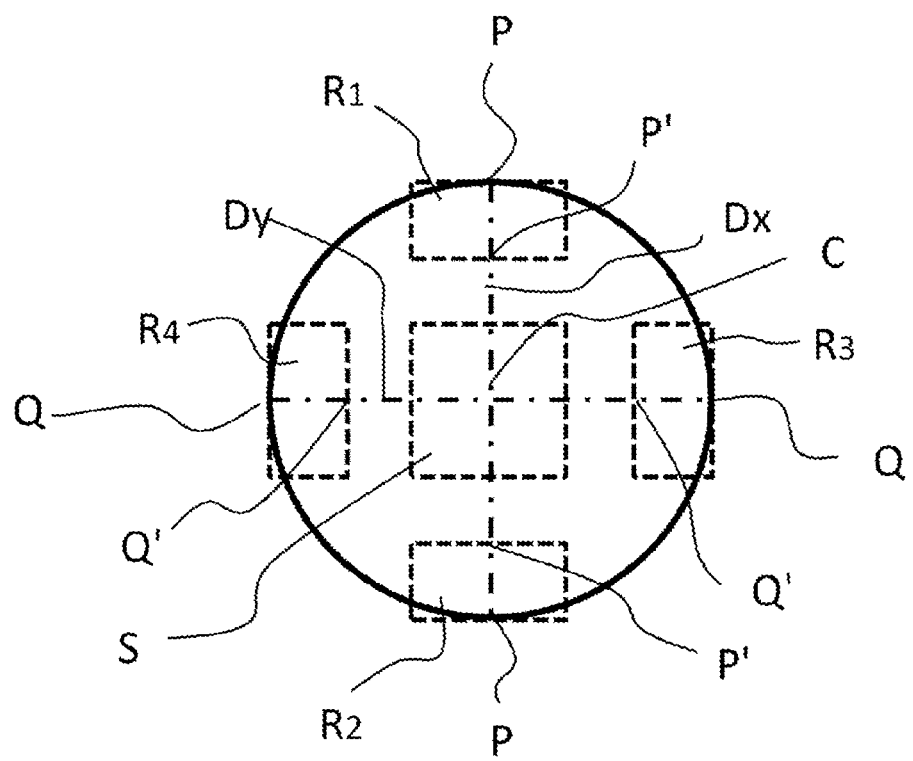

FERRITE PARTICLES, ELECTROPHOTOGRAPHIC DEVELOPER CARRIER CORE MATERIAL, ELECTROPHOTOGRAPHIC DEVELOPER CARRIER, AND ELECTROPHOTOGRAPHIC DEVELOPER

CROSS-REFERENCE TO RELATED APPLICATIONS

The present application claims priority under 37 U.S.C. § 371 to International Patent Application No. PCT/JP2020/006870, filed Feb. 20, 2020, which claims priority to and the benefit of Japanese Patent Application No. 2019-031162, filed on Feb. 25, 2019. The contents of these applications are hereby incorporated by reference in their entireties.

TECHNICAL FIELD

The present invention relates to a ferrite particle, an electrophotographic developer carrier core material, an electrophotographic developer carrier, and an electrophotographic developer.

BACKGROUND ART

An electrophotographic developing method refers to a method in which toner in a developer is caused to adhere to an electrostatic latent image formed on a photoreceptor to develop the image. Developers used for this method are classified into two-component developers that contain a toner and a carrier, and one-component developers that use only a toner. Regarding a developing method of using a two-component developer, a cascade method and the like were employed in the past; however, currently, a magnetic brush method of using a magnet roll is in the mainstream.

In the magnetic brush method, a carrier and a toner are stirred and mixed in a developing box filled with a developer to impart an electric charge to the toner. Then, the carrier is conveyed to the surface of a photoreceptor by means of a developing roll that holds a magnet. At that time, the electrically charged toner is conveyed by the carrier to the surface of the photoreceptor. After a toner image is formed by an electrostatic action on the photoreceptor, the carrier remaining on the developing roll is collected again into the developing box and stirred and mixed with a fresh toner, and thus the carrier is used repeatedly for a certain period of time.

With regard to a two-component developer, since the magnetic characteristics and electric characteristics of the carrier itself can be designed separately from the toner unlike a one-component developer, favorable controllability is obtained at the time of designing the developer. Therefore, a two-component developer is appropriate for a full-color developing apparatus where high image quality is required, an apparatus performing high-speed printing, where reliability for maintaining an image and durability are required, and the like.

In recent years, particle size reduction of the toner intended for developing electrostatic latent images with high precision is in progress. Along with the particle size reduction of the toner, particle size reduction of the carrier is also in progress. In the case where the particle size of the carrier is reduced, since the mechanical stress when stirring and mixing the carrier and the toner can be relieved and the occurrence of toner spending and the like can be suppressed, the lifetime of developers have been prolonged as compared to conventional cases. However, in the case where the particle size of the carrier is reduced, carrier scattering is likely to occur, and image defects such as white spots are likely to be generated.

In order to cope with such problems, various carriers with high magnetization or high resistance have been proposed. For example, Patent Literature 1 suggests a carrier in which with regard to ferrite particles represented by the compositional formula: $(MnO)x(MgO)y(Fe_2O_3)z$ and having a part of MnO, MgO and $Fe_2O_3$ substituted with SrO, magnetization is high while the variation of magnetization is suppressed, by adjusting the amounts of x, y and z respectively to predetermined ranges and by adjusting the amount of substitution of SrO to a predetermined amount.

Furthermore, Patent Literature 2 suggests a high-resistance carrier in which ferrite particles including a ferrite component represented by the compositional formula: $(MnO)x(MgO)y(Fe_2O_3)z$ in which the amounts of x, y and z are in predetermined ranges, and a predetermined amount of $ZrO_2$ that is not solid-solubilized in this ferrite component, are used as a carrier core material.

As disclosed in Patent Literature 1 and Patent Literature 2, by using a carrier with high magnetization or high resistance, carrier scattering can be suppressed, and image defects associated with carrier scattering can be suppressed. Here, in a two-component developer, image characteristics such as image density, fogging, white spots, gradation, and resolution power exhibit predetermined values from the early stage, and it is necessary that these characteristics do not vary and are maintained stable during the durable printing period. However, the ambient temperature and ambient humidity in the environment where a developer is used are not constant. Particularly, since resistance is easily affected by the ambient temperature and ambient humidity, a carrier with low environmental dependency of resistance is required in order to stably maintain the characteristics of the developer.

Thus, Patent Literature 3 suggests a carrier in which the environmental dependency of resistance has been reduced by acid-cleaning the surface of a carrier core material containing a ferrite component represented by the compositional formula: $Mn_xFe_{(3-x)}O_4$ as a main component. Patent Literature 4 suggests a carrier represented by the compositional formula: $(MnO)x(MgO)y(Fe_2O_3)z$ and containing Sr and Ti, in which the environmental dependency of resistance has been reduced even in a high-temperature and high-humidity environment by adjusting the compositional ratio to a predetermined range. Patent Literature 5 suggests a carrier in which the environmental dependency of resistance has been reduced by using a carrier core material containing a core composition represented by the compositional formula: $Mn_xFeO_{4-x}O_{4+y}$ as a main component and containing respective predetermined amounts of Si and Mg.

On the other hand, in Patent Literature 6, a carrier core material having high strength, in which excessive sintering and vacancy are prevented and cracking and chipping have been reduced, is achieved by adjusting the sintered state by further adding a predetermined amount of $SiO_2$ to magnesium ferrite containing a predetermined amount of Mg, and by adjusting the BET specific surface area to a predetermined range.

CITATION LIST

Patent Literature

Patent Literature 1: Japanese Patent No. 3,243,376
Patent Literature 2: Japanese Patent No. 3,872,025

Patent Literature 3: Japanese Patent No. 5,129,079
Patent Literature 4: Japanese Patent No. 5,850,331
Patent Literature 5: Japanese Patent No. 5,352,729
Patent Literature 6: JP-A-2011-28060

SUMMARY OF INVENTION

Technical Problem

However, for carriers that use the above-described conventional carrier core materials and the like (disclosed in Patent Literature 1 to Patent Literature 5), it is still difficult to sufficiently suppress carrier scattering in a high-temperature and high-humidity environment. When carrier scattering occurs, not only the above-described image defects occur, but also when a carrier having cracking and chipping adheres to a photoreceptor or a fixing roller, damages to these are brought about. Furthermore, in a carrier that uses the carrier core material disclosed in Patent Literature 6, since the carrier has high strength, cracking and chipping at the time of stirring are suppressed; however, the resin coating amount at the surface is likely to be decreased by abrasion over time. As a result, carrier scattering is likely to occur due to charge injection when the surface of the carrier core material is exposed. That is, even in the case where the high-strength carrier core material disclosed in Patent Literature 6 is used, carrier scattering cannot be sufficiently suppressed.

Thus, an object of the present invention is to provide a ferrite particle that has high strength and can suppress the occurrence of carrier scattering even in a high-temperature and high-humidity environment, an electrophotographic developer carrier core material, an electrophotographic developer carrier, and an electrophotographic developer.

Solution to Problem

In order to solve the above-described problems, a ferrite particle according to the present invention contains a crystal phase component containing a perovskite crystal represented by the compositional formula: $RZrO_3$ (provided that R represents an alkaline earth metal element), and has an apparent density in the range represented by the following formula:

$$1.90 \leq Y \leq 2.45$$

provided that Y in the formula is the apparent density ($g/cm^3$) of the ferrite particle.

According to the present invention, the ferrite particle preferably has a BET specific surface area in the range represented by the following formula:

$$0.08 \leq X \leq 0.550$$

provided that X in the formula is the BET specific surface area ($m^2/g$) of the ferrite particle.

With regard to the ferrite particle according to the present invention, it is preferable that the apparent density and the BET specific surface area satisfy the following relational formula.

$$-0.892X+2.34 \leq Y \leq -0.892X+2.49$$

With regard to the ferrite particle according to the present invention, R is preferably at least one element selected from the group consisting of Sr, Ca, and Ba.

According to the present invention, it is preferable to include 0.05% by mass or more and 2.50% by mass or less of the crystal phase component containing the perovskite crystal when a phase composition analysis of a crystal phase constituting the ferrite particle is performed by a Rietveld analysis of an X-ray diffraction pattern.

The ferrite particle according to the present invention preferably has a ratio log L/log H between a logarithmic value of a resistance value L (log Ω) in a low-temperature and low-humidity environment (10° C., relative humidity 20%) and a logarithmic value of a resistance value H (log Ω) in a high-temperature and high-humidity environment (30° C., relative humidity 80%) being preferably 1.0 or more and 1.15 or less when measured at a distance between electrodes of 2 mm and an applied voltage of 500 V. The ratio is more preferably 1.0 or more and 1.10 or less.

The ferrite particle according to the present invention preferably has the resistance value H of $1.0 \times 10^7$ (Ω) or more and $1.0 \times 10^9$ (Ω) or less, and a saturation magnetization obtainable by a VSM measurement when a magnetic field of 1K·1000/4π·A/m is applied being 55 emu/g or more and 65 emu/g or less.

The ferrite particle according to the present invention preferably contains a crystal phase component containing a spinel crystal represented by the compositional formula: $(MO)a(Fe_2O_3)b$ (provided that M represents at least one metal element selected from the group consisting of Fe, Mg, Mn, Cu, Zn, and Ni, and a+b=100 (mol %)) as a main component.

The ferrite particle according to the present invention preferably contains a crystal phase component containing a spinel crystal represented by the compositional formula: $(MnO)x(MgO)y(Fe_2O_3)z$ (provided that $15 \leq x \leq 50$, $2 \leq y \leq 35$, $45 \leq z \leq 60$, x+y+z=100 (mol %)) as a main component.

An electrophotographic developer carrier core material according to the present invention includes the ferrite particle.

An electrophotographic developer carrier according to the present invention includes the ferrite particle and a resin coating layer provided on a surface of the ferrite particle.

An electrophotographic developer according to the present invention includes the electrophotographic developer carrier and a toner.

The electrophotographic developer according to the present invention is also preferably used as a replenishment developer.

Advantageous Effects of Invention

According to the present invention, a ferrite particle that has a high strength and can suppress the occurrence of carrier scattering even in a high-temperature and high-humidity environment, an electrophotographic developer carrier core material, an electrophotographic developer carrier, and an electrophotographic developer can be provided.

BRIEF DESCRIPTION OF DRAWINGS

The FIGURE This is a diagram schematically illustrating a cross-section of a ferrite particle and is a diagram for describing a method for determining the dispersion degree of Zr in the ferrite particle.

DESCRIPTION OF EMBODIMENTS

Hereinafter, embodiments of the ferrite particle, the electrophotographic developer carrier core material, the electrophotographic developer carrier, and the electrophotographic developer according to the present invention will be described. Incidentally, according to the present specification, unless particularly stated otherwise, the ferrite particle, the electrophotographic developer carrier core material, the electrophotographic developer carrier, and the electrophotographic developer each mean an aggregate of particles, that is, a powder. First, embodiments of the ferrite particle will be described. Furthermore, in the following description, the ferrite particle according to the present invention will be mainly described as particles that are used as an electrophotographic developer carrier core material. However, the ferrite particle according to the present invention can be used for various use applications, including various functional fillers such as a magnetic ink, a magnetic fluid, a magnetic filler, a filler for bond magnet, and a filler for an electromagnetic wave shielding material, and electronic component materials, and the like, and the use application of the ferrite particle is not limited to the electrophotographic developer carrier core material.

1. Ferrite Particle and Electrophotographic Developer Carrier Core Material

First, embodiments of the ferrite particle according to the present invention will be described. The ferrite particle according to the present invention contains a crystal phase component containing a perovskite crystal represented by the compositional formula: $RZrO_3$ (provided that R represents an alkaline earth metal element) and satisfies predetermined physical properties.

1-1. Crystal Phase Component Containing a Perovskite Crystal

First, the crystal phase component containing a perovskite crystal represented by the compositional formula: $RZrO_3$ (provided that R represents an alkaline earth metal element) will be described.

As a two-component-based electrophotographic developer carrier suitable for a magnetic brush method, a resin-coated carrier in which a magnetic particle is used as a core material and the surface thereof is coated with a resin has been used. As the magnetic particle that is used as the core material, a ferrite particle that is a magnetic oxide containing ferric oxide ($Fe_2O_3$) as a main component is mainly used. In order to suppress carrier scattering associated with particle size reduction of the carrier, it is required to use a ferrite particle with a high magnetization and high resistance as the core material.

In recent years, a multi-element ferrite particle containing a metal element such as Mg, Mn, Sr, and Ca in addition to Fe has been widely used as the core material. When a ferrite is produced, metal oxides, metal hydroxides and the like which include metal elements of the intended composition are used as raw materials. In order to obtain a highly magnetized ferrite particle, it is required that a ferritization reaction of raw materials is caused to proceed sufficiently, and unreacted raw materials that do not exhibit magnetism (hereinafter, referred to as "unreacted raw materials") are prevented from remaining in the ferrite particle. However, in the case of the multi-element ferrite, since the formation temperature and formation rate of the ferrite vary depending on the combination of elements, and ferrite reactions proceed only on the contact surfaces between raw materials, it is difficult to completely ferritize the raw materials under general sintering conditions. Therefore, unreacted raw materials remain in the ferrite particle.

Furthermore, the raw materials of a ferrite include metals or metal compounds that are not involved in ferrite reactions, such as Na, as unavoidable impurities. These unavoidable impurities do not exhibit magnetism. Therefore, in order to obtain a highly magnetized impuritie, it is necessary to reduce the quantity of unavoidable impurities. However, no matter how high the purity of the raw materials used is, a very small quantity of unavoidable impurities is present in the raw materials, and it is not realistic to completely eliminate unavoidable impurities.

In addition, in the case where there are defects in the textural structure of the ferrite particle, magnetization of the ferrite particle is decreased. Examples of a structural defect that causes a decrease in magnetization include defects in the ferrite particle (e.g., lattice defects). In the case of a multi-element ferrite, since the ferrite reaction becomes complicated as compared to a single-component ferrite, structural defects are likely to occur.

On the other hand, since a ferrite particle contains metal oxides, the ferrite particle generally has a high resistance. However, when moisture adheres to the surface, resistance is decreased. Furthermore, unavoidable impurities including alkali metals such as Na, which are included in the raw materials, are easily ionized by the presence of moisture in the atmosphere. Therefore, when the quantity of unavoidable impurities in the ferrite particles increases, the resistance of the ferrite particles is lowered. Furthermore, in the case where the quantity of unavoidable impurities increases, the resistance is likely to fluctuate according to the change in ambient humidity.

In view of these matters, in order to obtain a ferrite particle having a high resistance and low environmental dependency of resistance, the quantity of unavoidable impurities in the ferrite particles needs to be reduced. However, as described above, it is not realistic to completely eliminate unavoidable impurities. Incidentally, since the unreacted raw materials (except for unavoidable impurities) are metal oxides, inclusion of unreacted raw materials is not a cause of the lowering of resistance of the ferrite particle.

Meanwhile, a ferrite particle is often a polycrystalline body, which is an aggregate of single crystals. Even if the composition of the ferrite particle is the same, the magnetic characteristics and electrical characteristics of the ferrite particle vary depending on the textural structure of the ferrite particle. Thus, the inventors of the present invention paid attention to the textural structure of the ferrite particle and found that in order to obtain a ferrite having a high magnetization and high resistance and having low environmental dependency of resistance, it is important to include a crystal phase component containing a perovskite crystal represented by the compositional formula: $RZrO_3$ (provided that R represents an alkaline earth metal element), thus finally conceiving the present invention.

The reason why the above-described problems can be solved by including a crystal phase component containing a perovskite crystal represented by the compositional formula: $RZrO_3$ (provided that R represents an alkaline earth metal element) is not clearly understood; however, the present inventors speculate the reason as follows.

At the grain boundaries of a ferrite particle, there are components that do not form a solid solution with ferrite, such as unreacted raw materials and unavoidable impurities. Furthermore, these components that have been squeezed out to the grain boundaries concomitantly with the growth of crystal grains are also present on the surface of the ferrite particle. In the case where the crystal grains constituting the ferrite particle are large, the grain boundaries are continuously formed inside the ferrite particle like a flow channel connecting one point with another point on the surface of the ferrite particle. The unavoidable impurities present at the surface or grain boundaries of the ferrite particle are easily ionized. Therefore, in the case where unavoidable impurities such as Na are continuously distributed at the grain boundaries that are continuously formed in the ferrite particle, when moisture adheres to the surface of the ferrite particle, the grain boundaries become like conduction paths, and the resistance of the ferrite particle is decreased. Furthermore, it is also speculated that in a ferrite particle having such a structure, the variation of resistance also increases due to a change in the ambient humidity. Furthermore, as described above, it is difficult to completely eliminate unreacted raw materials and unavoidable impurities in the ferrite particle.

On the other hand, since a crystal phase component containing a perovskite crystal represented by the compositional formula: $RZrO_3$ (provided that R represents an alkaline earth metal element) does not form a solid solution with, for example, another crystal phase having a different crystal structure, such as a spinel ferrite phase, this crystal phase component is dispersed at the grain boundaries of the ferrite particle. Therefore, in the ferrite particle including this crystal phase component, the grain boundary volume in the ferrite particle increases relatively as compared to a case where this crystal phase component is not included. In the case where the quantity of unavoidable impurities included in the ferrite particle is the same, when the grain boundary volume of the ferrite particle increases relatively, the distribution density of unavoidable impurities at the grain boundaries decreases relatively. At the grain boundaries, this crystal phase component, which is an insulating substance, is present in addition to the unavoidable impurities. In the ferrite particle according to the present invention, since grain boundaries are complicatedly distributed in the particle, and also, insulating substances such as unavoidable impurities and the crystal phase component are distributed discontinuously inside the grain boundaries, the grain boundaries can be suppressed from functioning like conduction paths. Therefore, it is speculated that the environmental dependency of resistance can be reduced by the ferrite particle according to the present invention.

Furthermore, for the ferrite particle, by uniformly dispersing the crystal phase component containing a perovskite crystal represented by the compositional formula: $RZrO_3$ (provided that R represents an alkaline earth metal element) inside the particle, a ferrite particle having a higher strength can be obtained. As described above, since the crystal phase component containing a perovskite crystal does not form a solid solution with other crystal phase components having different crystal structures, such as spinel ferrite phase, when these crystal phases segregate or grow abnormal grains, cracking and chipping are likely to occur, starting from the interface as the starting point. Therefore, it is preferable that in the ferrite particle, the crystal phase component containing a perovskite crystal is uniformly dispersed in the particle (surface and inner part).

Furthermore, in the case where the grain boundary volume in the ferrite particle is relatively small, unavoidable impurities are squeezed out at the grain boundaries to the surface, and as a result, the quantity of unavoidable impurities present on the surface of the ferrite particle becomes relatively large. On the other hand, in the case where the grain boundary volume in the ferrite particle is relatively large, the quantity of unavoidable impurities present on the surface of the ferrite particle can be decreased relatively. Therefore, the ferrite particle can be made to have a high resistance, and the environmental dependency of resistance attributed to the unavoidable impurities on the surface of the ferrite particle can be made small.

In addition, the crystal phase component containing a perovskite crystal represented by the compositional formula: $RZrO_3$ (provided that R represents an alkaline earth metal element) has high insulating properties, and as the crystal phase component is present at the grain boundaries or particle surface, increase of the resistance of the ferrite particle can be promoted. In addition, in order to obtain a ferrite particle containing the crystal phase component, a compound containing Zr (e.g., $ZrO_2$) is used as a raw material. For example, in the case where a multi-element ferrite has a composition including R, since a raw material containing R and a compound containing Zr undergo a solid-phase reaction, the content of the unreacted raw materials in the ferrite particle can be reduced. Therefore, the occurrence of structural defects can be suppressed, and a ferrite particle that is relatively highly magnetized can be obtained.

From such a reason, it is speculated that a ferrite particle containing a crystal phase component containing a perovskite crystal represented by the compositional formula: $RZrO_3$ (provided that R represents an alkaline earth metal element) can be imparted with a high magnetization and high resistance, and can reduce the environmental dependency of resistance, for the above-mentioned reasons.

Here, with respect to the ferrite particle, inclusion of a crystal phase component containing a perovskite crystal represented by the compositional formula: $RZrO_3$ (provided that R represents an alkaline earth metal element) implies that the crystal phase component is included at least in the inner part of the ferrite particles, and it is preferable that dispersion of the crystal phase component in the inner part of the ferrite particle is satisfactory, while it is more preferable that the crystal phase component is uniformly dispersed at the surface and in the inner part of the ferrite particle. In the following description, the ferrite particle according to the present invention will be described in more detail.

(1) R (Alkaline Earth Metal Element)

In the present invention, R represents at least one element selected from the group consisting of Ca, Sr, Ba, and Ra, that is, alkaline earth metal elements. Alkaline earth metal elements have sufficiently larger ionic radii than zirconium and form a perovskite crystal structure with zirconium. In the present invention, R is more preferably at least one element selected from the group consisting of Sr, Ca and Ba. These elements undergo a solid-phase reaction with zirconium under predetermined temperature conditions and form a perovskite crystal structure. Therefore, the ferrite particle according to the present invention can be obtained by controlling the sintering temperature in a production process for the ferrite particle to be in a predetermined temperature range.

(2) Content Proportion of Crystal Phase Component

It is preferable to contain 0.05% by mass or more and 2.50% by mass or less of the crystal phase component containing a perovskite crystal represented by the compositional formula: $RZrO_3$ when a phase composition analysis of the crystal phase constituting the ferrite particle is performed by a Rietveld analysis of an X-ray diffraction pattern.

When the content proportion of the crystal phase component containing a perovskite crystal represented by the compositional formula: $RZrO_3$ is in the above-described range, it is easy to uniformly disperse the crystal phase component in the inner part of the ferrite particle, and it is easier to suppress the occurrence of structural defects and to reduce the environmental dependency of resistance. Furthermore, by adjusting the content proportion to be in the above-described range, segregation of the crystal phase component can be suppressed, and a high-strength ferrite particle that is not likely to cause cracking and chipping when subjected to a mechanical stress can be obtained. As a result, carrier scattering can also be suppressed. In addition, by incorporating the crystal phase component in the above-described range, a ferrite particle having a high magnetization and high resistance and having more satisfactory environmental dependency of resistance can be obtained.

In order to obtain these effects, the ferrite particle preferably contains 0.10% by mass or more, more preferably 0.15% by mass or more, and even more preferably 0.20% by mass or more, of the crystal phase component. Furthermore, the ferrite particle preferably contains 2.00% by mass or less of the crystal phase component.

(3) Content Proportion of Zirconium

The ferrite particle preferably contains 0.1 mol % or more and 3.0 mol % or less of zirconium. In the case where the ferrite particle contains zirconium in this range, the content proportion of the crystal phase component containing a perovskite crystal represented by the compositional formula: $RZrO_3$ is approximately in the above-described range, and a ferrite particle having a high magnetization and high resistance and having low environmental dependency of resistance can be obtained. The content proportion of zirconium in the ferrite particle is more preferably 0.2 mol % or more. Furthermore, the content proportion of zirconium in the ferrite particle is more preferably 2.0 mol % or less, and even more preferably 1.5 mol % or less.

(4) Content Proportion of Alkaline Earth Metal Element

The content proportion of the alkaline earth metal element (R) is more preferably 0.1 mol % or more and 3.0 mol % or less. In the case where the ferrite particle contains the alkaline earth metal element (R) in this range, the content proportion of the crystal phase component containing a perovskite crystal represented by the compositional formula: $RZrO_3$ is approximately in the above-described range, and a ferrite particle having a high magnetization and high resistance and having low environmental dependency of resistance can be obtained. The content proportion of the alkaline earth metal element (R) in the ferrite particle is more preferably 0.2 mol % or more. Furthermore, the content proportion of the alkaline earth metal element (R) in the ferrite particle is more preferably 2.0 mol % or less, and even more preferably 1.5 mol % or less.

1-2. Composition

Regarding the ferrite particles, the composition thereof is not particularly limited as long as the ferrite particle contains a crystal phase component containing a perovskite crystal represented by the compositional formula: $RZrO_3$ (provided that R represents an alkaline earth metal element). However, from the viewpoint of obtaining a ferrite particle having a high magnetization and high resistance, it is preferable that the ferrite particle contains a crystal phase component containing a spinel crystal represented by the compositional formula: $(MO)a(Fe_2O_3)b$ (provided that M represents at least one metal element selected from the group consisting of Fe, Mg, Mn, Cu, Zn, and Ni, a+b=100 (mol %)) as a main component. Ferrite has crystal structures such as a spinel crystal structure, a magnetoplumbite crystal structure and a garnet crystal structure; and, a ferrite having a spinel crystal structure exhibits soft magnetism and is suitable as an electrophotographic developer carrier core material from the viewpoint that electrical characteristics such as resistance are also easily adjustable. Incidentally, the term main component means that when the ferrite contains a plurality of crystal phase components (including the crystal phase component containing a perovskite crystal represented by the compositional formula: $RZrO_3$ (provided that R represents an alkaline earth metal element)), the spinel crystal phase occupies the largest proportion among those crystal phase components, and particularly, the content of this spinel crystal phase component is preferably 50% by mass or more, more preferably 60% by mass or more, and even more preferably 70% by mass or more. The content of the spinel phase crystal phase component can be determined by the composition of metal elements and can be defined by the mass fraction obtainable when a phase composition analysis of the crystal phase constituting the ferrite particle is performed by a Rietveld analysis of an X-ray diffraction pattern, which will be described below.

In addition, it is even more preferable that the ferrite particle contains a crystal phase component containing a spinel crystal represented by the compositional formula: $(MnO)x(MgO)y(Fe_2O_3)z$ (provided that $15 \leq x \leq 50$, $2 \leq y \leq 35$, $45 \leq z \leq 60$, and x+y+z=100 (mol %)) as the main composition. By combining the above-mentioned composition with a conventional ferrite production method, a ferrite having 50% by mass or more of the spinel crystal phase component can be obtained.

By adopting a composition including Mn, the magnetization on a low magnetic field side can be increased. Furthermore, by adopting a composition including Mn, reoxidation of ferrite at the time of ejection from the furnace after sintering can be prevented. Particularly, by adjusting the content of Mn to 15 mol % or more, a relative increase in the content of Fe can be suppressed, and an increase in the content proportion of magnetite component in the ferrite particle can be suppressed. Therefore, decrease of magnetization on a low magnetic field side can be suppressed, and the occurrence of carrier adhesion can be suppressed. Furthermore, since it is easy to adjust the resistance value to a satisfactory value for performing electrophotographic printing, the occurrence of fogging, deterioration of gradation, and occurrence of image defects such as white spots can be suppressed. In addition, the toner consumption can be maintained appropriately. In the case where the content of Mn is adjusted to be 50 mol % or less, resistance becomes very high, and the occurrence of image defects such as white spots can be suppressed.

By adopting a composition including Mg, a ferrite particle having a high resistance can be obtained. Furthermore, by adjusting the content of Mg to 2 mol % or more, the content of Mn becomes appropriate with respect to the content of Fe, and it is easy to adjust the magnetization and resistance of the ferrite particle to be in a satisfactory range for performing electrophotographic printing. Therefore, the occurrence of fogging, deterioration of gradation, occurrence of brush streaks, and occurrence of image defects such as carrier scattering can be suppressed. In addition, in the case where magnesium hydroxide is used as an Mg raw material, when the sintering temperature at the time of producing the ferrite particle is low, hydroxyl groups may remain in the ferrite particle in some cases. By adjusting the content of Mg to 35 mol % or less, the amount of residual hydroxyl groups present due to the raw materials can be reduced. Therefore, the electrical characteristics of the amount of electric charge and resistance of the ferrite particle can be suppressed from fluctuating under the influence of ambient humidity due to the residual hydroxyl groups, and the environmental dependency of electrical characteristics of the ferrite particle can be further improved.

The ferrite particle is formed of a magnetic oxide containing ferric oxide as a main component. Therefore, it is a prerequisite that x<z is satisfied. By adjusting the content of Fe to be 45 mol % or more and 60 mol % or less, it is easy to adjust the magnetization and resistance of the ferrite particle to be in a satisfactory range for performing electrophotographic printing.

1-3. Magnetic Characteristics

In the case of using the ferrite particle as a core material of an electrophotographic developer carrier, the saturation magnetization obtainable by a VSM measurement when a magnetic field of 1 K·1000/4π·A/m is applied is preferably 55 emu/g or more and 65 emu/g or less. In the case where the saturation magnetization is 55 emu/g or more, the magnetic force of the core material is high, and carrier scattering caused by low magnetization can be satisfactorily suppressed. Furthermore, although saturation magnetization and electrical resistance are in a trade-off relationship, in the case where the saturation magnetization of the ferrite particle is in this range, a satisfactory balance is achieved between the two, and an electrophotographic developer that can satisfactorily perform electrophotographic printing with high image quality can be obtained. Furthermore, even if magnetization is high, when resistance is low, carrier scattering caused by low resistance may occur. By adjusting the saturation magnetization to 65 emu/g or less, carrier scattering caused by low resistance can be satisfactorily suppressed.

1-4. Electrical Characteristics (1) Environmental Variation Ratio of Resistance (Log L/Log H)

The ratio log L/log H between the logarithmic value (log $\Omega$) of resistance value L in a low-temperature and low-humidity environment (10° C., relative humidity 20%) and the logarithmic value (log $\Omega$) of resistance value H in a high-temperature and high-humidity environment (30° C., relative humidity 80%) when measured at a distance between electrodes of 2 mm and an applied voltage of 500 V (hereinafter, environmental variation ratio of resistance (log L/log H)) is preferably 1.0 or more and 1.15 or less. In the case where the environmental variation ratio of resistance (log L/log H) is in this range, the variation of resistance when the ambient humidity changes is small, the occurrence of carrier scattering can be suppressed even in a high-temperature and high-humidity environment, and electrophotographic printing with high image quality can be carried out satisfactorily even at a high temperature and a high humidity. This environmental variation ratio of resistance is more preferably 1.0 or more and 1.10 or less.

(2) Resistance Value H

The resistance value H is preferably $1.0 \times 10^7$ ($\Omega$) or more and $1.0 \times 10^9$ ($\Omega$) or less. In the case where the resistance value of the ferrite particle at a high temperature and a high humidity is in this range, the occurrence of carrier scattering can be suppressed even in the high-temperature and high-humidity environment.

1-5. Physical Properties (1) Apparent Density

The apparent density of the ferrite particle shall be in the range represented by the following formula:

$$1.90 \leq Y \leq 2.45$$

Here, Y in the formula represents the apparent density (g/cm$^3$) of the ferrite particle.

The apparent density as used herein refers to a value measured by a funnel method in accordance with JIS Z 2504:2012. In the case where the apparent density of the ferrite particle is in the range represented by the formula, there are fewer internal pores, and strength is increased. Therefore, in the case where a carrier that uses the ferrite particle as a core material is used, even if a mechanical stress is applied at the time of mixing and stirring with a toner, cracking and chipping can be prevented.

In this regard, in the case where the apparent density of the ferrite particle is less than 1.90, there are many internal pores. Therefore, when a mechanical stress is applied to a carrier that uses the ferrite particle as a core material at the time of mixing and stirring with a toner, cracking and chipping are likely to occur. When cracking and chipping of the carrier occur, there is a risk that image defects caused by carrier scattering may occur, or the carrier may adhere to a photoreceptor drum and a fixing roller to damage these. On the other hand, in the case where the apparent density of the ferrite particle is more than 2.50, there are fewer internal pores; however, crystal grains become coarse due to excessive sintering. At this time, in the case where a crystal phase component containing a perovskite crystal is segregated in the particle, in this case as well, when a mechanical stress is applied, cracking and chipping are likely to occur starting from the interface of the crystal phase as a starting point as described above, and there is a risk that image defects associated with carrier scattering, damage to a photoreceptor drum and a fixing roller, and the like may be caused, which is not preferable.

In order to obtain these effects, the apparent density of the ferrite particle is preferably 2.00 or more, more preferably 2.05 or more, and even more preferably 2.10 or more. Furthermore, the apparent density of the ferrite particle is more preferably 2.40 or less, and even more preferably 2.35 or less.

In order to obtain a ferrite particle having an apparent density in the above-described range, it can be adjusted by appropriately adjusting the blending quantities of alkaline earth metal element-containing compounds and zirconium oxide, which serve as raw materials used at the time of producing the ferrite particle, the particle size and specific surface area of zirconium oxide, sintering temperature, sintering time, ambient oxygen concentration at the time of sintering, and the like. By adjusting these, segregation of a crystal phase component containing a perovskite crystal can be suppressed, and the crystal phase component can be uniformly dispersed at the surface and in the inner part of the particle. Furthermore, for the reasons described earlier, the occurrence of structural defects such as pores can be prevented, and for example, growth of other crystal phase components such as a spinel ferrite phase can be suppressed. From these matters, it is conceived that a ferrite particle having a desired apparent density can be obtained by appropriately adjusting the above-described conditions.

(2) BET Specific Surface Area

The BET specific surface area of the ferrite particle is preferably in the range represented by the following formula:

$$0.08 \leq X \leq 0.550$$

Here, X in the formula represents the BET specific surface area (m$^2$/g) of the ferrite particle.

The BET specific surface area as used herein can be defined as a value measured by using, for example, a specific surface area analyzer (model: Macsorb HM model-1208 (manufactured by Mountech Co., Ltd.). In the case where the BET specific surface area of the ferrite particle is in the range represented by the formula, the surface unevenness of the ferrite particle is in an appropriate range with respect to the particle size. Therefore, in the case where the ferrite particle is used as a core material, the surface can be satisfactorily coated with a resin. Furthermore, since the difference in surface unevenness with respect to the particle size becomes small, concentration of load on protruding parts when a mechanical stress is applied to the surface can be suppressed, and cracking and chipping can be prevented. Therefore, in the case where the ferrite particle is used as a core material, detachment of resin from the surface at the time of mixing and stirring with a toner can be suppressed, cracking and chipping of the carrier can be prevented, and carrier scattering and the like can be prevented.

In this regard, in the case where the BET specific surface area is less than 0.08, since the surface unevenness of the ferrite particle with respect to the particle size becomes small or becomes too small, when the ferrite particle is used as a core material and the surface is coated with a resin, the resin can be easily detached at the time of mixing with a toner, and the like. When the resin is detached from the surface of the carrier, the core material is exposed at that portion. That is, since the surface of the ferrite particle is exposed, image defects caused by carrier scattering and deterioration in chargeability are likely to occur. On the other hand, in the case where the BET specific surface area is more than 0.550, since the surface unevenness of the ferrite particle with respect to the particle size increases in number or increases in size, it becomes difficult to coat the protruding parts of the ferrite particle with a resin, and the protruding parts may be exposed. Therefore, a carrier having a sufficient charge-imparting property to the toner may not be obtained in some cases. Furthermore, in the case where the surface unevenness increases in size, load is concentrated on the protruding parts as a mechanical stress is applied to the protruding parts of the carrier surface at the time of mixing with a toner or the like, and cracking and chipping of the carrier are likely to occur, which is not preferable. That is, the strength of the carrier may not be maintained during the use of the developer in some cases, and it is not preferable.

In order to obtain these effects more satisfactorily, the BET specific surface area of the ferrite particle is more preferably 0.080 or more. Similarly, the BET specific surface area of the ferrite particle is more preferably 0.400 or less, and even more preferably 0.350 or less.

The ferrite particle having the BET specific surface area in the above-described arrange can be obtained by appropriately controlling the granulation conditions and sintering conditions at the time of producing the ferrite particle. Examples of the granulation conditions include slurry particle size during granulation, speed of atomizer disc rotation, slurry discharge amount, drying temperature, and the like. Furthermore, examples of the sintering conditions include sintering temperature, sintering time, ambient oxygen concentration during sintering, and the like. It is speculated that by adjusting these, raw materials of a crystal phase component containing a perovskite crystal represented by the compositional formula: $RZrO_3$ (provided that R represents an alkaline earth metal element) can be satisfactorily mixed and dispersed with other raw materials, and as a result, a ferrite particle in which the crystal phase component is uniformly dispersed at the surface and in the inner part of the particle can be obtained, and the apparent density of the ferrite particle can be adjusted to a desired range.

(3) Apparent Density and BET Specific Surface Area

It is preferable that the apparent density and the BET specific surface area of the ferrite particle satisfy the following relational formula:

$$-0.892X+2.34 \leq Y \leq -0.892X+2.49$$

Here, in the formula, X represents the BET specific surface area and Y represents the apparent density.

In the case where the apparent density and the BET specific surface area of the ferrite particle satisfy the relational formula, a ferrite particle in which the above-described crystal phase component is uniformly dispersed in the inner part of the particle, there are few internal pores, the crystal grains maintain a uniform size, and the surface unevenness is in an appropriate range, can be obtained. In the case of using the ferrite particle as a core material, when the ferrite particle is subjected to a stress during stirring in a developing device, for example, when attention is paid to a certain single particle, the particle comes into contact with another particle, the wall surface of the developing device or the like, through a plurality of protruding parts. That is, the stress applied to that particle can be suppressed from being concentrated on one protruding part. Furthermore, since the crystal grains are uniform, the applied stress is dispersed inside the particle, and a stress being locally exerted on a portion of grain boundaries and the like can be suppressed. Thereby, a carrier in which the occurrence of cracking, chipping and carrier scattering can be suppressed as compared to the case where the relational formula is not satisfied, can be obtained.

(4) Particle Strength Index

When a particle strength index is determined by the method described in the Examples described later, the particle strength index of the ferrite particle can achieve less than 1.5, and can achieve less than 1.3. By reducing internal pores and dispersing the crystal phase component containing a perovskite crystal uniformly in the particle, a ferrite particle having a high strength can be obtained. Therefore, according to the ferrite particle, even when a mechanical stress is applied during stirring with a toner or the like, the occurrence of cracking and chipping can be suppressed, and the occurrence of carrier scattering caused by generation of a fine powder can be suppressed. In addition, in the case where a carrier that uses a ferrite particle as a core material and has a resin coating layer on the surface thereof is used, when cracking and chipping occur, the ferrite particle as the core material may be exposed, the chargeability of the carrier may be changed, and a decrease in the image density and toner scattering may occur in some cases. However, according to this ferrite particle, since the particle strength is high, these inconveniences can be suppressed over a long period of time, and a carrier having a longer service life and higher reliability can be realized.

Particularly, the particle strength index is more preferably 1.2 or less, and even more preferably 1.1 or less.

(4) Volume Average Particle Size ($D_{50}$)

In the case where the ferrite particle is used as a core material of an electrophotographic developer carrier, the volume average particle size ($D_{50}$) thereof is preferably 24 μm or more and 40 μm or less. Here, the volume average particle size as used herein refers to a value measured by a laser diffraction and scattering method in accordance with JIS Z 8825:2013. In the case where the volume average particle size is in this range, the charge-imparting property to a toner is high, and this charge-imparting property can be maintained over a long period of time. Therefore, lifetime prolongation of electrophotographic developers can be promoted.

In contrast, in the case where the volume average particle size ($D_{50}$) of the ferrite particle is less than 24 μm, since the particle size is small, carrier scattering is likely to occur. Furthermore, in the case where the volume average particle size ($D_{50}$) of the ferrite particle is less than 24 μm, since the particle size is small, the ferrite particles easily aggregate. In the case where the ferrite particle is used as a core material and the surface thereof is coated with a resin to obtain a carrier, when the ferrite particles are in an aggregated state, the surface of the individual ferrite particle cannot be coated satisfactorily with a resin. Subsequently, when the aggregates of the ferrite particles are loosened during production or during use of the developer, the developer has a higher content percentage of the carrier having large regions that are not coated with a resin. Therefore, in the case where a developer is produced by using a carrier that uses such a ferrite particle as a core material, a sufficient charge-imparting property to a toner may not be obtained, which is not preferable.

On the other hand, in the case where the volume average particle size ($D_{50}$) of the ferrite particle is more than 40 μm, the particle size of individual particle constituting the powder increases. Therefore, when compared with a ferrite particle having a small volume average particle size ($D_{50}$), the surface area of the carrier that contributes to frictional charging with a toner is small with respect to the whole powder. Therefore, a sufficient charge-imparting property to a toner may not be obtained. In order to improve this, when surface unevenness is given to individual ferrite particle to increase the surface area of the individual ferrite particle, the surface area of the carrier that contributes to frictional charging with a toner can be increased. In this case, the charge-imparting property to a toner is enhanced; however, cracking and chipping of the carrier are likely to occur as a mechanical stress is applied to the protruding parts on the carrier surface at the time of mixing with a toner and the like, and therefore, it is not preferable. That is, the strength of the carrier may not be maintained at the time of using the developer, which is not preferable.

2. Electrophotographic Developer Carrier

Next, the electrophotographic developer carrier according to the present invention will be described. The electrophotographic developer carrier according to the present invention is characterized by containing the above-described ferrite particle and a resin coating layer provided on the surface of the ferrite particle. That is, it is characterized by using the ferrite particle as a core material of the electrophotographic developer carrier. Since the ferrite particle is as described above, the resin coating layer will be mainly described here.

(1) Type of Coating Resin

The type of the resin constituting the resin coating layer (coating resin) is not particularly limited. For example, a fluororesin, an acrylic resin, an epoxy resin, a polyamide resin, a polyamideimide resin, a polyester resin, an unsaturated polyester resin, a urea resin, a melamine resin, an alkyd resin, a phenol resin, a fluoroacrylic resin, an acrylic-styrene resin, a silicone resin, and the like can be used. Furthermore, modified silicone resins obtained by modifying a silicone resin and the like with various resins such as an acrylic resin, a polyester resin, an epoxy resin, a polyamide resin, a polyamideimide resin, an alkyd resin, a urethane resin, and a fluororesin, and the like may also be used. For example, from the viewpoint of suppressing resin detachment caused by a mechanical stress applied at the time of stirring and mixing with a toner, the coating resin is preferably a thermosetting resin. Examples of the thermosetting resin suitable as the coating resin include an epoxy resin, a phenol resin, a silicone resin, an unsaturated polyester resin, a urea resin, a melamine resin, an alkyd resin, and resins containing those. However, as described above, the type of the coating resin is not particularly limited, and an adequate coating resin can be appropriately selected depending on the type of the toner to be combined, the use environment, and the like.

Furthermore, the resin coating layer may be constructed by using one type of resin, or the resin coating layer may be constructed by using two or more kinds of resins. In the case of using two or more kinds of resins, the two or more kinds of resins may be mixed to form a single layer of the resin coating layer, or multiple layers of the resin coating layer may be formed. For example, it is also preferable to provide a first resin coating layer having satisfactory adhesiveness to the ferrite particle on the surface of the ferrite particle and provide, on the surface of the first resin coating layer, a second resin coating layer for imparting desired charge-imparting performance to the carrier, or the like.

(3) Resin Coating Amount

The amount of resin coating the surface of the ferrite particle (resin coating film amount) is preferably 0.10% by mass or more and 10% by mass or less with respect to the ferrite particle used as the core material. In the case where the resin coating amount is less than 0.10% by mass, it is difficult to sufficiently coat the surface of the ferrite particle with a resin, and it is difficult to obtain a desired charge-imparting ability. Furthermore, in the case where the resin coating amount is more than 10% by mass, aggregation between carrier particles occurs during the production, and not only a decrease in productivity such as a decrease in the product yield is caused, but also the developer characteristics such as fluidity of the developer in an actual device or the charge-imparting property to a toner vary, which is not preferable.

(4) Additives

The resin coating layer may contain an additive intended for controlling the electrical resistance, the amount of electric charge, and the charging rate of the carrier, such as a conductive agent and a charge control agent. Examples of the conductive agent include conductive carbons, oxides such as titanium oxide and tin oxide, and various organic conductive agents. However, since the electrical resistance of the conductive agent is low, in the case where the amount of addition of the conductive agent is too large, a charge leak is likely to occur. Therefore, the content of the conductive agent is preferably 0.25% by mass or more and 20.0% by mass or less, more preferably 0.5% by mass or more and 15.0% by mass or less, and even more preferably 1.0% by mass or more and 10.0% by mass or less, with respect to the solid content of the coating resin.

Examples of the charge control agent include various charge control agents and silane coupling agents that are generally used for toner. The types of these charge control agents and coupling agents are not particularly limited; and charge control agents such as a nigrosin dye, a quaternary ammonium salt, an organometallic complex, and a metal-containing monoazo dye; and an aminosilane coupling agent, a fluorinated silane coupling agent, and the like can be preferably used. The content of the charge control agent is preferably 0.25% by mass or more and 20.0% by mass or less, more preferably 0.5% by mass or more and 15.0% by mass or less, and even more preferably 1.0% by mass or more and 10.0% by mass or less, with respect to the solid content of the coating resin.

3. Electrophotographic Developer

Next, embodiments of the electrophotographic developer according to the present invention will be described. The electrophotographic developer includes the above-described electrophotographic developer carrier and a toner.

As the toner constituting the electrophotographic developer, for example, a polymerized toner produced by a polymerization method and a pulverized toner produced by a pulverization method can all be preferably used. These toners may include various additives, and any toner may be used as long as it can be used as an electrophotographic developer in combination with the above-described carrier.

The volume average particle size ($D_{50}$) of the toner is preferably 2 μm or more and 15 μm or less, and more preferably 3 μm or more and 10 μm or less. In the case where the volume average particle size ($D_{50}$) of the toner is in this range, an electrophotographic developer that can perform electrophotographic printing with high image quality can be obtained.

The mixing ratio of the carrier and the toner, that is, the toner concentration, is preferably 3% by mass or more and 15% by mass or less. An electrophotographic developer including the toner at this concentration allows a desired image density to be easily obtained and can suppress fogging or toner scattering more satisfactorily.

On the other hand, in the case of using the electrophotographic developer as a replenishment developer, the content of the toner is preferably 2 parts by mass or more and 50 parts by mass or less with respect to 1 part by mass of the carrier.

The electrophotographic developer can be suitably used for various electrophotographic developing apparatuses to which a magnetic brush developing method of subjecting a carrier to suction adhesion to a magnetic drum or the like by magnetic force to be a brush form to convey a toner, causing the toner to adhere to an electrostatic latent image formed on a photoreceptor or the like while applying a bias electric field, and forming a visible image, is applied. This electrophotographic developer can be used not only for an electrophotographic developing apparatus that uses a direct current bias electric field when a bias electric field is applied, but also for an electrophotographic developing apparatus that uses an alternating bias electric field in which an alternating current bias electric field is superposed on a direct current bias electric field.

4. Production Method

In the following description, methods for producing the ferrite powder, electrophotographic developer carrier core material, electrophotographic developer carrier, and electrophotographic developer according to the present invention will be described.

4-1. Ferrite Powder and Electrophotographic Developer Carrier Core Material

The ferrite powder and the electrophotographic developer carrier core material according to the present invention can be produced as follows.

First, appropriate amounts of raw materials are weighed so as to obtain a desired ferrite composition, subsequently pulverized and mixed with a ball mill, a vibrating mill or the like for 0.5 hours or more, and preferably 1 hour or more and 20 hours or less, and calcined.

For example, in order to produce a ferrite particle containing a crystal phase component containing a spinel crystal represented by the compositional formula: $(MnO)_x(MgO)_y(Fe_2O_3)_z$ (provided that $15 \leq x \leq 50$, $2 \leq y \leq 35$, $45 \leq z \leq 60$, $x+y+z=100$ (mol %)) as a main composition, the respective raw materials are weighed such that x, y, and z have desired values, and the raw materials are pulverized and mixed. As the raw materials, for example, $Fe_2O_3$, $Mg(OH)_2$ and/or $MgCO_3$, and at least one kind of manganese compound selected from the group consisting of $MnO_2$, $Mn_2O_3$, $Mn_3O_4$, and $MnCO_3$ are preferably used.

The ferrite particle according to the present invention contain a crystal phase component containing a perovskite crystal represented by the compositional formula: $RZrO_3$ (provided that R represents an alkaline earth metal element). Therefore, with regard to the alkaline earth metal element (R), an oxide of the alkaline earth metal element (R) is used as a raw material and weighed so as to obtain a desired amount of addition, and pulverized and mixed with other raw materials. With regard to Zr, $ZrO_2$ can be used as a raw material.

Here, in the case of producing a ferrite particle containing 0.05% by mass or more and 2.50% by mass or less of the crystal phase component containing a perovskite crystal (provided that as defined as the mass fraction obtainable when a phase composition analysis of the crystal phase constituting the ferrite particle is performed by a Rietveld analysis of an X-ray diffraction pattern), it is preferable to blend 0.1 or more and 3.0 or less of $ZrO_2$, and it is more preferable to blend 0.2 or more and 1.5 or less of $ZrO_2$, with respect to 100 of the main component raw materials as a molar ratio. Furthermore, it is preferable to blend 0.1 or more and 3.0 or less of an oxide of the alkaline earth metal element (R), and it is more preferable to blend 0.2 or more and 1.5 or less of $ZrO_2$, with respect to 100 of the main component raw materials as molar ratios. The crystal phase component containing a perovskite crystal is produced by a solid-phase reaction between an oxide of an alkaline earth metal element (R) and $ZrO_2$. Therefore, the production amount of the crystal phase component containing a perovskite crystal can be adjusted by appropriately changing the amounts of addition and the ratio of addition of the oxide of the alkaline earth metal element (R) and $ZrO_2$ within the preferred ranges of the blending quantities.

When the ferrite particle according to the present invention is produced, $ZrO_2$ is weighed so as to obtain a desired amount of addition and is pulverized and mixed with other raw materials. In order to uniformly disperse zirconium dioxide inside the particle, it is desirable to add zirconium dioxide at the time of pulverizing and mixing of raw materials. Furthermore, it is also preferable that raw materials other than $ZrO_2$ are pulverized and mixed, and calcined in the atmosphere, subsequently $ZrO_2$ is added thereto, and the mixture is further pulverized and mixed. In that case, a pulverization product obtained by pulverizing and mixing the raw materials other than $ZrO_2$ is pelletized by using a pressure molding machine or the like, subsequently the product is calcined in the atmosphere at a temperature of 700° C. or higher and 1,200° C. or lower, and then $ZrO_2$ is added thereto.

After all the raw materials including $ZrO_2$ are pulverized and mixed, or after the raw materials other than $ZrO_2$ are pulverized and mixed and are calcined, a predetermined amount of $ZrO_2$ is added to the calcination product thus obtained, and then the mixture is further pulverized with a ball mill, a vibrating mill or the like, in either case, water is added to the pulverized mixture, followed by fine pulverization using a bead mill or the like, to thereby obtain slurry. The degree of pulverization can be controlled by adjusting the diameter of the beads used as a medium, the composition, and the pulverization time. In order to uniformly disperse the raw materials, beads which are fine particles having a particle size of 1 mm or less are preferably used as the medium. Furthermore, in order to uniformly disperse the raw materials, the raw materials are preferably pulverized such that the volume average particle size ($D_{50}$) of the pulverization product is 2.5 μm or less, and more preferably pulverized to be 2.0 μm or less.

In addition to this, in order to obtain the ferrite particle according to the present invention, it is desirable to use $ZrO_2$ having a BET specific surface area of 20 to 150 m²/g and a volume average particle size ($D_{50}$) of 0.5 μm to 2.5 μm as a raw material. By using a raw material having such characteristics, the growth of a crystal phase component containing a perovskite crystal can be caused to uniformly proceed while satisfactorily dispersing $ZrO_2$ in the particle. Segregation of the crystal phase component in the particle and abnormal grain growth of various crystal phase components can be suppressed. Therefore, cracking and chipping occurring at the interface of different crystal phases that do not solid-solubilize each other can be suppressed even when a mechanical stress is applied, and the strength of the ferrite particle can be enhanced. Furthermore, in order to suppress abnormal grain growth, it is preferable to perform pulverization such that the particle size ($D_{90}$) of the coarse side of the grain size distribution is 3.5 μm or less. By adjusting these, the crystal phase component containing a perovskite crystal can be dispersed more uniformly from the surface to the inner part of the particle.

Next, it is preferable that a dispersant, a binder and the like are added as necessary to the slurry thus obtained, and the viscosity of the slurry is adjusted to 2 poise or higher and 4 poise or lower. At this time, polyvinyl alcohol or polyvinylpyrrolidone can be used as the binder.

The slurry adjusted as described above is sprayed by using a spray dryer and dried to obtain a granulation product. At this time, regarding the granulation conditions, it is preferable to adjust the discharge amount to 20 Hz or more and 50 Hz or less, the speed of atomizer disc rotation to 11,000 rpm or more and 20,000 rpm or less, and the drying temperature to the range of 100° C. or higher and 500° C. or lower. For example, in order to obtain a ferrite particle having an apparent density in the above-described range, it is preferable to adjust the speed of atomizer disc rotation to 11,000 rpm or more and 16,000 rpm or less, and the drying temperature to 150° C. or higher and 300° C. or lower.

Next, the granulation product is classified before being sintered, to remove any fine particles included in the granulation product, from the viewpoint of obtaining a ferrite powder having a uniform grain size. Classification of the granulation product can be carried out by using an airflow classification, a sieve or the like, which are well-known.

Next, the classified granulation product is sintered. It is preferable that the granulation product is subjected to a preliminary sintering as necessary and then to a sintering. In the case of performing the preliminary sintering, the sintering temperature is preferably set to 600° C. or higher and 900° C. or lower.

Furthermore, the sintering is preferably performed by maintaining the granulation product in an inert atmosphere or a weakly oxidizing atmosphere at a temperature of 850° C. or higher for 4 hours or longer and 24 hours or shorter. However, the sintering temperature is not particularly limited as long as the ferrite particle according to the present invention can be obtained. Here, the inert atmosphere or the weakly oxidizing atmosphere mean that the oxygen concentration in a mixed gas atmosphere of nitrogen and oxygen is 0.1% by volume (1,000 ppm) or more and 5% by volume (50,000 ppm) or less, and the ambient oxygen concentration is more preferably 0.1% by volume (1,000 ppm) or more and 3.5% by volume (35,000 ppm) or less, and even more preferably 0.1% by volume (1,000 ppm) or more and 2.5% by volume (25,000 ppm) or less.

For example, in order to produce a ferrite particle containing a crystal phase component containing a spinel crystal represented by the compositional formula: $(MnO)x(MgO)y(Fe_2O_3)z$ (provided that 15≤x≤50, 2≤y≤35, 45≤z≤60, x+y+z=100 (mol %)) as a main composition, it is more preferable to perform the sintering by, while sufficiently generating a ferrite component containing a spinel crystal, maintaining for 3 hours or longer at a temperature adequate for the generation of the ferrite component containing a spinel crystal (850° C. or higher and 1,150° C. or lower) for dispersing zirconium component at the grain boundaries, and then maintaining for 1 hour or longer at a temperature adequate for generating a crystal phase component containing a perovskite crystal represented by the compositional formula: $RZrO_3$, such as strontium zirconate (e.g., 1,150° C. or higher and 1,500° C. or lower). Furthermore, at that time, the BET specific surface area can be adjusted to be in the range of the present invention by appropriately controlling the sintering temperature, sintering time, and ambient oxygen concentration during sintering depending on the type of the alkaline earth metal element (R) and the blending quantity of $ZrO_2$.

For example, in the case of strontium zirconate ($SrZrO_3$), in order to adjust the apparent density to be in the range of the present invention while sufficiently generating a crystal phase component containing a perovskite crystal, it is preferably maintained for 1 hour or longer by setting the sintering temperature to a temperature of preferably 1,170° C. or higher and 1,400° C. or lower, more preferably 1,180° C. or higher and 1,350° C. or lower, and even more preferably 1,200° C. or higher and 1,330° C. or lower. In this case, the blending quantity of zirconium oxide ($ZrO_2$) is preferably set to 0.05 mol to 3.00 mol.

Furthermore, for example, in the case of calcium zirconate ($CaZrO_3$) and barium zirconate ($BaZrO_3$), it is preferable that the raw material is finely pulverized, a reaction accelerator is added thereto, and the sintering is performed at a predetermined temperature or lower. In order to generate a crystal phase component containing a perovskite crystal of calcium zirconate ($CaZrO_3$) or barium zirconate ($BaZrO_3$), in the case where a reaction accelerator is not added, it is necessary to perform sintering at a high temperature of 2,000° C. or higher. On the other hand, by finely pulverizing the raw materials to have a primary particle size of about several dozen nanometers and adding an aluminum compound (e.g., alumina ($Al_2O_3$)) as a reaction accelerator, these crystal phase components containing a perovskite crystal can be generated even at a temperature of 1,500° C. or lower. As such, the ferrite particle according to the present invention can be obtained by maintaining at a temperature adequate for producing the crystal phase component containing a perovskite crystal depending on the intended composition, and also by adjusting other conditions as necessary.

Incidentally, at the time of performing the sintering, it is preferably performed in a sintering furnace of a type in which a granulation product (object to be fired) is placed in a saggar or the like and allowed to pass through a hot part in an immovable state, such as a tunnel kiln or an elevator kiln, rather than a sintering furnace of a type in which the granulation product is caused to pass through a hot part while flowing, such as a rotary kiln. In a sintering furnace of a type in which the granulation product is caused to pass through a hot part while flowing, such as a rotary kiln, in the case where the oxygen concentration in the sintering atmosphere is low, the granulation product may adhere to the inner surface of the furnace when passing through the hot part, and sufficient heat may not be applied to the granulation product that passes through the inner side of the furnace while flowing. In that case, since the granulation product passes through the hot part while the granulation product cannot be sufficiently sintered, even if sintering of the surface of the obtained sintered product is sufficiently carried out, internal sintering may be often insufficient. Since such a sintering product does not satisfy the strength required as an electrophotographic developer carrier core material, and also, the ferrite reaction in the inner part occurs insufficiently, the magnetic characteristics and electrical characteristics required as an electrophotographic developer carrier core material may not be satisfied. In addition, in the case where sintering at the inner part of the sintered product is insufficient, a crystal phase component containing a perovskite crystal represented by the compositional formula: $RZrO_3$ cannot be sufficiently produced in the sintering step. Therefore, it is difficult to obtain the ferrite particle according to the present invention.

On the other hand, in the case where the granulation product is sintered in a sintering furnace of a type in which the granulation product is placed in a saggar or the like and allowed to pass through a hot part in an immovable state, the inner part of the object to be sintered can be sufficiently sintered, and therefore, a ferrite particle which has a high magnetization and high resistance and in which a crystal phase component containing a perovskite crystal represented by the compositional formula: $RZrO_3$ has been sufficiently generated, can be easily obtained. From these reasons, when the sintering step is carried out, a tunnel kiln, an elevator kiln and the like are preferably used.

Subsequently, the sintered product is subjected to crushing and classification to obtain ferrite particles. Regarding the classification method, a wind force classification, a mesh filtration method, a sedimentation method, and the like, which are well-known, are used to adjust the grain size to a desired particle size. In the case of performing a dry collecting, the ferrite particles can also be collected by using a cyclone or the like. In the case of performing grain size adjustment, two or more kinds of the above-mentioned classification methods may be selected and performed, or coarse powder side particles and fine powder side particles may be removed by changing the conditions in one kind of classification method.

Subsequently, if necessary, a surface oxidation treatment can be applied by heating the surface of the ferrite particle at a low temperature, to adjust the surface resistance of the ferrite particle. The surface oxidation treatment can be carried out by subjecting the ferrite particle to a heat treatment by using a rotary electric furnace, a batch electric furnace or the like in an oxygen-containing atmosphere such as air atmosphere, at 400° C. or higher and 730° C. or lower, and preferably at 450° C. or higher and 650° C. or lower. In the case where the heating temperature at the time of the surface oxidation treatment is lower than 400° C., the ferrite particle surface cannot be sufficiently oxidized, and desired surface resistance characteristics may not be obtained in some cases. On the other hand, in the case where the heating temperature is higher than 730° C., in a manganese-containing ferrite, oxidation of manganese proceeds excessively, and magnetization of the ferrite particle is decreased, which is not preferable. In order to form an oxide coating film uniformly on the surface of the ferrite particle, a rotary electric furnace is preferably used. However, the surface oxidation treatment is an optional process.

4-2. Electrophotographic Developer Carrier

The electrophotographic developer carrier according to the present invention uses the above-described ferrite particle as a core material and has a resin coating layer provided on the surface of the ferrite particle. The resin constituting the resin coating layer is as described above. When a resin coating layer is formed on the surface of the ferrite particle, any known method, for example, a brush coating method, a spray drying method using a fluidized bed, a rotary drying method, a liquid immersion drying method using a universal stirrer, or the like can be employed. In order to increase the proportion of the resin coated area with respect to the surface of the ferrite particle (resin coating ratio), a spray drying method using a fluidized bed is preferably employed. Regardless of which method is employed, the ferrite particle can be subjected to a resin coating treatment once or several times. The resin coating liquid used at the time of forming a resin coating layer may include the above-described additives. Furthermore, since the resin coating amount on the surface of the ferrite particle is as described above, the description will be omitted here.

After a resin coating liquid is applied on the surface of the ferrite particle, heating may be performed by an external heating method or an internal heating method, as necessary. For the external heating method, a fixed or fluid electric furnace, a rotary electric furnace, a burner furnace, or the like can be used. For the internal heating method, a microwave furnace can be used. In the case of using a UV-curable resin as the coating resin, a UV heater is used. Heating is required to be performed at a temperature equal to or higher than the melting point or the glass transition point of the coating resin. In the case of using a thermosetting resin, a condensation-crosslinking resin or the like as the coating resin, heating needs to be performed at a temperature at which curing of these resins proceeds sufficiently.

4-3. Electrophotographic Developer

Next, a method for producing the electrophotographic developer according to the invention will be described.

The electrophotographic developer according to the invention includes the above-described electrophotographic developer carrier and a toner. Regarding the toner, as described above, both a polymerized toner and a pulverized toner can be preferably used.

The polymerized toner can be produced by a known method such as a suspension polymerization method, an emulsion polymerization method, an emulsion aggregation method, an ester elongation polymerization method, or a phase inversion emulsification method. For example, a colored dispersion liquid in which a colorant is dispersed in water by using a surfactant is mixed and stirred with a polymerizable monomer, a surfactant and a polymerization initiator in an aqueous medium, the polymerizable monomer is emulsified and dispersed in the aqueous medium and is polymerized while stirring and mixing, and then a salting agent is added thereto to salt out polymer particles. The particles obtained by salting out are filtered, washed, and dried, whereby a polymerized toner can be obtained. Subsequently, an external additive may be added to the dried toner particles, as necessary.

In addition, when producing the polymerized toner particle, a toner composition including a polymerizable monomer, a surfactant, a polymerization initiator, a colorant, and the like is used. A fixability improving agent and a charge control agent can be blended into this toner composition.

Regarding the pulverized toner, for example, a binder resin, a colorant, a charge control agent, and the like are sufficiently mixed by using a mixing machine such as a Henschel mixer, subsequently melt-kneaded in a twin-screw extruder or the like to uniformly disperse, the resultant is cooled and then finely pulverized by using a jet mill or the like, the obtained product is classified, for example, classified by a wind force classifier or the like, whereby a toner having a desired particle size can be obtained. If necessary, a wax, a magnetic powder, a viscosity regulator, and other additives may be incorporated. Furthermore, after classification, an external additive can also be added.

Next, the present invention will be specifically described by presenting Examples and Comparative Examples. However, the present invention is not limited to the following Examples.

Example 1

(1) Ferrite Particle

In Example 1, a ferrite particle containing a crystal phase component containing a spinel crystal represented by the compositional formula: $(MnO)x(MgO)y(Fe_2O_3)z$ as a main component and containing a crystal phase component containing a perovskite crystal represented by the compositional formula: $SrZrO_3$ (R=Sr), was produced as follows. First, a MnO raw material, a MgO raw material and a $Fe_2O_3$ raw material were respectively weighed as main component raw materials, at molar ratios of MnO equivalent: 38.3, MgO equivalent: 10.4, and $Fe_2O_3$: 51.3. Furthermore, a SrO raw material was weighed SrO: 0.8 with respect to the main component raw materials: 100 in a molar ratio. Here, trimanganese tetroxide was used as the MnO raw material, magnesium oxide was used as the MgO raw material, ferric oxide was used as the $Fe_2O_3$ raw material, and strontium carbonate was used as the SrO raw material.

Next, the weighed raw materials were pulverized for 5 hours in a dry media mill (vibrating mill, stainless steel beads having a diameter of ⅛ inches), and the obtained pulverization product was pelletized into about 1 mm square by using a roller compactor. From the obtained pellets, coarse powder was removed by a vibrating sieve having a mesh size of 3 mm and fine powder was removed by a vibrating sieve having a mesh size of 0.5 mm, and then the remaining pellets were heated in a continuous electric furnace at 800° C. for 3 hours to perform calcination. Next, the pellets were pulverized by using a dry media mill (vibrating mill, stainless steel beads having a diameter of ⅛ inches) until the average particle size reached about 5 μm. At this time, the pulverization time was set to 6 hours.

To the obtained pulverization product, water and zirconium dioxide having a BET specific surface area of 30 $m^2/g$ and an average particle size of 2 μm as a $ZrO_2$ raw material were added, and the mixture was pulverized for 6 hours by using a wet media mill (transverse bead mill, zirconia beads having a diameter of 1 mm). At this time, zirconium dioxide was added to the pulverization product so as to be $ZrO_2$: 1.0 with respect to the main component raw materials: 100 in a molar ratio. When the particle size of the obtained slurry (primary particle size of the pulverization product) was measured with a laser diffraction grain size distribution analyzer (LA-950, Horiba, Ltd.), $D_{50}$ was about 2 μm and $D_{90}$ was 3.2 μm.

In addition, an appropriate amount of a dispersant was added to the slurry prepared as described above, PVA (polyvinyl alcohol) as a binder was added at a proportion of 0.4% by mass with respect to the solid content (amount of calcination product in the slurry), and then the mixture was granulated and dried by a spray dryer. Grain size adjustment of the obtained granulation product was performed, subsequently the granulation product was heated by using a rotary electric furnace at 800° C. for 2 hours in an air atmosphere, to remove organic components such as a dispersant and a binder.

Subsequently, sintering of the granulation product was performed by using a tunnel electric furnace, by maintaining the granulation product at a sintering temperature (retention temperature) of 1,250° C. in an atmosphere with an oxygen concentration of 0% by volume for 3 hours. At this time, the rate of temperature increase was set to 100° C./hour, and the rate of cooling was set to 110° C./hour. The obtained sintered product was crushed by a hammer crusher and was classified by a gyro sifter (vibrating sieve machine) and a turbo classifier (air flow classifier) to perform grain size adjustment, and low magnetic force products were separated by magnetic ore dressing, to thereby obtain a ferrite particle.

The obtained ferrite particle was subjected to a surface oxidation treatment by using a rotary electric furnace equipped with a hot part and a cooling part subsequent to the hot part, and then cooled, to thereby obtain a ferrite particle that had been subjected to a surface oxidation treatment. In the surface oxidation treatment, an oxide coating film was formed on the surface of the ferrite particle in the hot part in an air atmosphere at 540° C. The principal production conditions for the ferrite particle of Example 1 are presented in Table 1.

(2) Electrophotographic Developer Carrier

The above-described ferrite particle was used as a core material, and the ferrite particle was coated with an acrylic resin as follows to obtain a carrier of Example 1.

First, an acrylic resin solution (resin solid content 10% by mass) was prepared by mixing an acrylic resin (DIANAL LR-269, manufactured by Mitsubishi Rayon Co., Ltd.) and toluene. This resin solution and the ferrite particle of Example 1 were mixed by using a universal stirrer, to thereby coat the surface of the ferrite particle with the resin solution. At that time, the resin solution was used in such an amount that the resin solid content was 1.5% by mass with respect to the ferrite particle. Subsequently, the ferrite particle having the resin solution adhered thereto was heated under stirring at 145° C. for 3 hours by using a heat exchange stirring and heating apparatus, to volatilize volatile components included in the resin solution to dry the ferrite particle. As a result, an electrophotographic developer carrier of Example 1 containing a resin coating layer on the surface of the ferrite particle was obtained.

(3) Electrophotographic Developer

The electrophotographic developer carrier and a toner were mixed by stirring for 30 minutes by using a TURBULA mixer, to obtain 1 kg of a developer (toner concentration 7.5% by weight). Here, for the toner, a commercially available toner having negative polarity (cyan toner, for DocuPrint C3530, manufactured by Fuji Xerox; average particle size about 5.8 μm), which is used for full-color printers, was used.

Example 2

In the present Example, a ferrite particle of Example 2 was produced in the same manner as in Example 1, except that the SrO raw material was weighed so as to be SrO: 3.00 with respect to the main component raw materials: 100 in a molar ratio, and the sintering temperature (retention temperature) during sintering was set to 1,280° C. The principal production conditions for Example 2 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 3

In the present Example, a ferrite particle of Example 3 was produced in the same manner as in Example 1, except that the SrO raw material was weighed so as to be SrO: 0.10 with respect to the main component raw materials: 100 in a molar ratio, and the sintering temperature (retention temperature) during sintering was set to 1,215° C. The principal production conditions for Example 3 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 4

In the present Example, a ferrite particle of Example 4 was produced in the same manner as in Example 1, except that the SrO raw material was weighed so as to be SrO: 3.00 and the $ZrO_2$ raw material was weighed so as to be $ZrO_2$: 0.10 with respect to the main component raw materials: 100 in a molar ratio, and the sintering temperature (retention temperature) during sintering was set to 1,230° C. The principal production conditions for Example 4 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 5

In the present Example, a ferrite particle of Example 5 was produced in the same manner as in Example 1, except that the SrO raw material was weighed so as to be SrO: 0.10 and the $ZrO_2$ raw material was weighed so as to be $ZrO_2$: 3.00 with respect to the main component raw materials: 100 in a molar ratio, and the sintering temperature (retention temperature) during sintering was set to 1,270° C. The principal production conditions for Example 5 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 6

In the present Example, a ferrite particle of Example 6 was produced in the same manner as in Example 1, except that the SrO raw material was weighed so as to be SrO: 3.00 and the $ZrO_2$ raw material was weighed so as to be $ZrO_2$: 3.00 with respect to the main component raw materials: 100 in a molar ratio, and the sintering temperature (retention temperature) during sintering was set to 1,320° C. The principal production conditions for Example 6 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 7

In the present Example, a ferrite particle of Example 7 was produced in the same manner as in Example 1, except that the sintering temperature (retention temperature) during sintering was set to 1,210° C., the ambient oxygen concentration during sintering was set to 1.3% by volume, and the surface oxidation treatment was not performed. The principal production conditions for Example 7 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 8

In the present Example, a ferrite particle of Example 8 was produced in the same manner as in Example 1, except that the $ZrO_2$ raw material was weighed so as to be $ZrO_2$: 1.20 with respect to the main component raw materials: 100 in a molar ratio, and the sintering temperature (retention temperature) during sintering was set to 1,215° C. The principal production conditions for Example 8 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 9

In the present Example, a ferrite particle of Example 9 was produced in the same manner as in Example 1, except that the $ZrO_2$ raw material was weighed so as to be $ZrO_2$: 0.80 with respect to the main component raw materials: 100 in a molar ratio, and the sintering temperature (retention temperature) during sintering was set to 1,250° C. The principal production conditions for Example 9 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 10

In the present Example, a ferrite particle of Example 10 was produced in the same manner as in Example 1, except that the sintering temperature (retention temperature) during sintering was set to 1,200° C. The principal production conditions for Example 10 are presented in Table 1. Furthermore, an electrophotographic developer carrier was produced in the same manner as in Example 1, except that this ferrite particle was used as the core material, and an electrophotographic developer was produced by using this electrophotographic developer carrier.

Example 11

In the present Example, a ferrite particle of Example 11 was produced in the same manner as in Example 1, except that the sintering temperature (retention temperature) during sintering was set to 1,300° C. The principal production conditions for Example 11 are presented in Table 1. Furthermore, an electrophotographic developer carrier was produced in the same manner as in Example 1, except that this ferrite particle was used as the core material, and an electrophotographic developer was produced by using this electrophotographic developer carrier.

COMPARATIVE EXAMPLES

Comparative Example 1

In the present Comparative Example, a ferrite particle of Comparative Example 1 was produced in the same manner as in Example 1, except that $ZrO_2$ was not added, and the sintering temperature (retention temperature) during sintering was set to 1,280° C. The principal production conditions for Comparative Example 1 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 2

In the present Comparative Example, a ferrite particle of Comparative Example 2 was produced in the same manner as in Example 1, except that the $ZrO_2$ raw material was weighed so as to be $ZrO_2$: 0.05 with respect to the main component raw materials: 100 in a molar ratio, and the sintering temperature (retention temperature) during sintering was set to 1,200° C. The principal production conditions for Comparative Example 2 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 3

In the present Comparative Example, a ferrite particle of Comparative Example 3 was produced in the same manner as in Example 1, except that the SrO raw material was weighed so as to be SrO: 0.05 with respect to the main component raw materials: 100 in a molar ratio, the $ZrO_2$ raw material was weighed so as to be $ZrO_2$: 0.05 with respect to the main component raw materials: 100 in a molar ratio, and the sintering temperature (retention temperature) during sintering was set to 1,200° C. The principal production conditions for Comparative Example 3 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 4

In the present Comparative Example, a ferrite particle of Comparative Example 4 was produced in the same manner as in Example 1, except that SrO was not added, and the sintering temperature (retention temperature) during sintering was set to 1,200° C. The principal production conditions for Comparative Example 4 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 5

In the present Comparative Example, a ferrite particle of Comparative Example 5 was produced in the same manner as in Example 1, except that SrO was not added, and the $ZrO_2$ raw material was weighed so as to be $ZrO_2$: 3.00 with respect to the main component raw materials: 100 in a molar ratio. The principal production conditions for Comparative Example 5 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 6

In the present Comparative Example, a ferrite particle of Comparative Example 6 was produced in the same manner as in Example 1, except that a CaO raw material was used instead of the SrO raw material, the CaO raw material was weighed so as to be CaO equivalent: 0.80 with respect to the main component raw materials: 100 in a molar ratio, $ZrO_2$ was not added, and the sintering temperature (retention temperature) during sintering was set to 1,200° C. Incidentally, $CaCO_3$ was used as the CaO raw material. The principal production conditions for Comparative Example 6 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 7

In the present Comparative Example, a ferrite particle of Comparative Example 7 was produced in the same manner as in Example 1, except that a $TiO_2$ raw material was used instead of the $ZrO_2$ raw material, the $TiO_2$ raw material was weighed so as to be $TiO_2$: 0.80 with respect to the main component raw materials: 100 in a molar ratio, and the sintering temperature (retention temperature) during sintering was set to 1,200° C. The principal production conditions for Comparative Example 7 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 8

In the present Comparative Example, a ferrite particle of Comparative Example 8 was produced in the same manner as in Example 1, except that the SrO raw material was weighed so as to be SrO: 0.05 and the $ZrO_2$ raw material was weighed so as to be $ZrO_2$: 0.05 with respect to the main component raw materials: 100 in a molar ratio, and the sintering temperature (retention temperature) during sintering was set to 1,100° C. The principal production conditions for Comparative Example 8 are presented in Table 1. Furthermore, an electrophotographic developer carrier was produced in the same manner as in Example 1, except that this ferrite particle was used as the core material, and an electrophotographic developer was produced by using this electrophotographic developer carrier.

Comparative Example 9

In the present Comparative Example, a ferrite particle of Comparative Example 9 was produced in the same manner as in Example 1, except that the SrO raw material was weighed so as to be SrO: 0.05 and the $ZrO_2$ raw material was weighed so as to be $ZrO_2$: 0.05 with respect to the main component raw materials: 100 in a molar ratio, and the sintering temperature (retention temperature) during sintering was set to 1,360° C. The principal production conditions for Comparative Example 9 are presented in Table 1. Furthermore, an electrophotographic developer carrier was produced in the same manner as in Example 1, except that this ferrite particle was used as the core material, and an electrophotographic developer was produced by using this electrophotographic developer carrier.

<Evaluation>

For the ferrite particles of each Example and each Comparative Example obtained as described above, (1) content of the perovskite crystal phase component, (2) apparent density, (3) BET specific surface area, (4) volume average particle size, (5) saturation magnetization, and (6) resistance were evaluated. Furthermore, (7) quantity of carrier scattering was evaluated by using the electrophotographic developers of each Example and each Comparative Example obtained as described above. In addition, for the respective ferrite particles, (8) particle strength index and (9) dispersion degree of Zr element were evaluated.

In the following description, the respective evaluation methods and measurement methods as well as evaluation results will be described.

1. Evaluation Methods and Measurement Methods (1) Content of Perovskite Crystal Phase Component (Mass %)

The ferrite particles produced in each Example and each Comparative Example were used as samples, and a powder X-ray diffraction pattern was subjected to a Rietveld analysis to determine the content of a perovskite crystal phase component represented by the compositional formula: $RZrO_3$ (provided that R represents an alkaline earth metal element) in each ferrite particle. In some cases, it may be difficult to perform identification and quantitative determination of each crystal phase by waveform separation of a powder X-ray diffraction pattern; however, identification and quantitative determination of each phase are enabled by a Rietveld analysis based on the crystal structure model.

As an X-ray diffraction apparatus, "X'Pert PRO MPD" manufactured by PANalytical B.V. was used. As an X-ray source, a Co tubular bulb (CoK(a radiation) was used. As an optical system, a focused beam optical system and a high-speed detector "X'Celarator" were used. The measurement conditions are as follows.

Scan speed: 0.08°/sec
Divergence slit: 1.0°
Scattering slit: 1.0°
Light receiving slit: 0.15 mm
Voltage and current value of encapsulated tube: 40 kV/40 mA
Measurement range: 2θ=15° to 90°
Cumulative number: 5 times Based on the obtained measurement results, the crystal structure was identified as follows from the structures disclosed in "National Institute for Materials Science, "AtomWork" (URL: http://crystdb.nims.go.jp/)".

Phase A: Crystal phase composed of manganese ferrite (spinel crystal)
Crystal structure: Space group Fd-3m (No. 227)

Phase B: Crystal phase composed of a perovskite crystal represented by compositional formula: $RZrO_3$
Crystal structure: Space group Pnma (No. 62)

Phase C: Zirconium dioxide (zirconia)
Crystal structure: Space group P-42m (No. 111)

Next, the abundance ratio in terms of mass was calculated as the phase composition ratio of each crystal phase by refining the identified crystal structure by using the analysis software "RIETAN-FP v2.83 (http://fujioizumi.verse.jp/download/download.html)".

The profile function was subjected to asymmetricalization by Howard's method using the Thompson, Cox, and Hasting's pseudo-Voigt function. After it was confirmed that the Rwp value and S value representing the accuracy of fitting were Rwp: 2% or less and S value: 1.5 or less, respectively, and the main peaks of the phases B and C were fitted at 2θ=350 to 37°, optimization of various parameters was carried out.

Based on the results of the Rietveld analysis of the X-ray diffraction pattern carried out as described above, the content (mass %) of the crystal phase component containing a perovskite crystal (phase B) when the phase composition analysis of the crystal phases constituting the ferrite particle was carried out, was determined.

(2) Apparent Density

Measurement of the apparent density was carried out in accordance with JIS Z2504:2012 (Determination of apparent density of metallic powders).

(3) BET Specific Surface Area

The ferrite particles produced in each Example and each Comparative Example were used as samples, and the BET specific surface area was determined by using a specific surface area analyzer (Macsorb HM model-1208, Mountech Co., Ltd.) by the following procedure. First, about 20 g of a sample was placed on a glass Petri dish and then was degassed up to −0.1 MPa with a vacuum dryer. After it was confirmed that the sample was degassed, and the degree of vacuum in the glass Petri dish reached −0.1 MPa or lower, the sample was heated to 200° C. for 2 hours. About 5 to 7 g of the sample that had been subjected to these pretreatments was accommodated in a standard sample cell for exclusive use in the specific surface area analyzer. The mass of the sample accommodated in the standard sample cell was accurately weighed with a precision balance. Then, the standard sample cell accommodating the sample was mounted on a measurement port, and measurement of the BET specific surface area was carried out by a one-point method at a temperature of 10° C. to 30° C. and a relative humidity of 20% to 80%. Upon completion of the measurement, the mass of the sample was inputted, and the calculated value was designated as the measured value of BET specific surface area.

(4) Volume Average Particle Size ($D_{50}$)

The volume average particle size ($D_{50}$) was measured as follows by using a MicroTrac grain size analyzer (Model 9320-X100) manufactured by NIKKISO CO., LTD., Ltd. The ferrite particles produced in each Example and each Comparative Example were used as samples, and a sample was prepared by introducing 10 g of each sample and 80 ml of water into a 100-ml beaker, adding two droplets or three droplets of a dispersant (sodium hexametaphosphate) thereto, and dispersing the mixture for 20 seconds by using an ultrasonic homogenizer (model UH-150 manufactured by SMT Co., LTD.) by setting the output power level to level 4 to remove any foam generated on the beaker surface. By using this sample, the volume average particle size of the sample was measured by the MicroTrac grain size analyzer.

(5) Saturation Magnetization

Saturation magnetization was measured by using a vibrating sample magnetometer (model: VSM-C7-10A (manufactured by Toei Industry Co., Ltd.)). The specific measurement procedure was as follows. First, the ferrite particles produced in each Example and each Comparative Example were used as samples, and a cell having an inner diameter of 5 mm and a height of 2 mm was filled with a sample and was mounted in the above-described apparatus. Then, a magnetic field was applied thereto and was swept up to 1 K·1000/47t·A/m (=1 kOe). Next, the applied magnetic field was reduced, and a hysteresis curve was produced on a recording paper. From the data of this curve, magnetization when the applied magnetic field was 1 K·1000/4π·A/m was read out and was designated as the saturation magnetization.

(6) Resistance

The ferrite particles produced in each Example and each Comparative Example were used as samples, and the resistance value L (Ω) in a low-temperature and low-humidity environment (10° C., relative humidity 20%), the resistance value H (Ω) in a high-temperature and high-humidity environment (30° C., relative humidity 80%) and the environmental variation ratio of resistance (log L/log H) were measured by the following procedure. First, non-magnetic parallel flat plate electrodes (10 mm×40 mm) were disposed to face each other at a distance between electrodes of 2.0 mm, and the space therebetween was filled with 200 mg of a sample. The sample was maintained between the parallel flat plate electrodes by a magnet attached to the parallel flat plate electrodes (surface magnetic flux density: 1,500 Gauss, area of the magnet in contact with the electrodes: 10 mm×30 mm). Then, a voltage of 500 V was applied between the parallel flat plate electrodes facing each other, and measurement was made by using an electrometer (manufactured by Keithley Instruments, LLC, insulation resistance meter model 16517A). The resistance value L and the resistance value H are resistance values obtained by exposing a sample in constant-temperature and constant-humidity chambers in which the ambient temperature and humidity have been adjusted to the low-temperature and low-humidity environment (10° C., relative humidity 20%) and the high-temperature and high-humidity environment (30° C., relative humidity 80%), respectively, for 12 hours or longer and then making measurement by the above-described procedure in the environments. Furthermore, based on the logarithmic values of the resistance value L and the resistance value H measured as such, the environmental variation ratio of resistance (log L/log H) was determined by the following formula. Table 1 shows logarithmic values of the resistance values L and H (log L and log H) and the environmental variation ratio of resistance (log L/log H).

Environmental variation ratio of resistance (log $L$/log $H$)=logarithmic value of resistance value $L$/logarithmic value of resistance value $H$ (7) Quantity of Carrier Scattering The quantity of carrier scattering was evaluated as follows, by using the electrophotographic developers produced in each Example and each Comparative Example. In a constant-temperature and constant-humidity chamber in which the ambient temperature and humidity had been adjusted to a high-temperature and high-humidity environment (30° C., relative humidity 80%), printing of 1000 (1k) test images was performed under suitable exposure conditions by using a full-color electrophotographic developing machine (imagio MP C2500, manufactured by Ricoh Co., Ltd.), subsequently three sheets of solid images were printed, and the sum of the quantities of carrier scattering in the images was counted by visual inspection.

(8) Particle Strength Index

For the ferrite particles produced in each Example and each Comparative Example, the particle strength index thereof was determined as follows.

The particle strength index can be calculated from the difference in the quantities of mesh passage before and after the ferrite particle was subjected to a crushing treatment.

(Quantity of Mesh Passage X Before Crushing Treatment)

The quantity of mesh passage X before a crushing treatment was determined as follows. At the time of measuring the quantity of mesh passage X, an apparatus for measuring the amount of electric charge, BLOW-OFF (Kyocera Chemical TB-200) was used, and ferrite particles weighed to obtain a volume of 30 mL were used as a sample.

First, the weight of a dedicated cell (Faraday gauge) having 635M (mesh) (mesh size 20 μm) stuck thereon is weighed, 0.5000±0.0005 g of a ferrite particle are weighed and introduced into the dedicated cell (this is designated as introduced weight A), and the weight B of the dedicated cell containing the ferrite particle is measured. Subsequently, the dedicated cell containing the ferrite particle is mounted in the apparatus for measuring the amount of electric charge, BLOW-OFF, blowing is performed for 30 seconds at a blow pressure of 0.5 kgf/cm², subsequently the dedicated cell is removed, and the weight C of the dedicated cell containing a carrier core material after blowing is measured. Then, the quantity of mesh passage of the carrier core material is determined based on the following Formula (1).

Quantity of mesh passage (weight %)=(Weight $B$ before blowing−weight $C$ after blowing)/introduced weight $A$×100(%) (1)

(Quantity of Mesh Passage Y after Crushing Treatment)

The quantity of mesh passage Y after a crushing treatment was determined in the same manner as described above, after the ferrite particle was subjected to a crushing treatment as follows. The crushing treatment was carried out by accommodating the ferrite particle in a sample case (inner diameter φ 78 mm×inner height 37 mm, made of stainless steel) of a sample mill (SK-M2, Kyoritsu Riko Co., Ltd.) as a small-sized pulverizer, and stirring the sample at a speed of rotation of 15,000 rpm (without load) for 30 seconds by using a motor of AC 100 V, 120 W, and 2.7 Å.

As the crushing blade in the sample mill, M2-04 (Kyoritsu Riko Co., Ltd.) was used. Furthermore, a fresh product of the crushing blade was used every time the crushing treatment for one sample was completed.

(Particle Strength Index)

Based on the quantities of mesh passage before and after the crushing treatment determined as described above, the particle strength index was determined by the following Formula (2).

Particle strength index (weight %)=Quantity of mesh passage $Y$ after crushing treatment (weight %)−quantity of mesh passage $X$ before crushing treatment (weight %) (2)

(9) Dispersion Degree of Zr Element

For the ferrite particles produced in each Example and each Comparative Example, the dispersion degree of Zr element defined by the following formula was measured.

Dispersion degree of Zr=Zr($s$)/Zr($c$)

Here, Zr(s): amount of Zr (mass %) at the surface part of a particle cross-section measured by energy dispersive X-ray analysis Zr(c): amount of Zr (mass %) at the central part of a particle cross-section measured by energy dispersive X-ray analysis Here, the procedure will be described with reference to the FIGURE. The central part of a cross-section (particle cross-section) of a ferrite particle is defined as follows.

When the maximum diameter in the particle cross-section (e.g., SEM image) is denoted by line segment Dx, the middle point of the line segment Dx is denoted by center C of the particle cross-section, and end points of the line segment Dx are respectively denoted by point P. Then, a square in which the center C is set as the center position, and the length of one side is 35% of the length of the line segment Dx, is designated as square S. A region surrounded by this square S is defined as the central part.

Furthermore, the surface part of the particle cross-section is defined as follows. A point on the line segment Dx, which is the position away from the point P toward the center C at a distance of 15% of the length of the line segment Dx, is denoted by point P'. Then, a rectangle in which a line segment that has a length of 35% of the length of the line segment Dx, orthogonally intersects the line segment Dx, and has the point P or the point P' as the middle point, constitutes a long side, and a line segment having a length of 15% of the length of the line segment Dx constitutes a short side, is designated as rectangle R1. In the present invention, a region surrounded by this rectangle R1 in the cross-section of a ferrite particle is defined as the surface part. Incidentally, the FIGURE illustrates a cross-sectional shape of the ferrite particle simplified to imitate a circle for explanation and does not illustrate the actual cross-sectional shape of the ferrite particle according to the present invention.

The central part and the surface part of the particle cross-section defined as such are subjected to energy dispersive X-ray analysis (EDX analysis), and the contents of Zr element for the respective regions are measured. The specific measurement method is as follows.

(a) A cross-section sample for measurement is produced by embedding ferrite particles in a resin and performing cross-sectional processing by ion milling. The ion milling is performed by using IM4000PLUS manufactured by Hitachi High-Technologies Corporation in an argon atmosphere by setting the acceleration voltage of the ion beam to 6.0 kV. Here, as the ferrite single particle to be analyzed is selected a particle having a maximum diameter Dx in the range of $D_{50} \times 0.8 \leq Dx \leq D_{50} \times 1.2$ when the volume average particle size of the ferrite particle (powder) including the ferrite single particles is designated as $D_{50}$.

(b) For the obtained cross-section sample, the cross-section of the ferrite particle to be analyzed is observed by using a scanning electron microscope (SEM, SU8020, manufactured by Hitachi High-Technologies Corporation) by setting the acceleration voltage to 15 kV and WD to 15 mm. At this time, the magnification ratio is set such that only one ferrite particle to be analyzed exists in the visual field, and the entire particle is within the visual field.

(c) Then, an EDX analysis is performed for the central part and the surface part (regions defined as described above) of the ferrite particle cross-section. In the EDX analysis, mapping collection is performed for Fe, Mn, Mg, Sr, and Zr by using an energy dispersive X-ray analyzer (EMax X-Max50, manufactured by Horiba, Ltd.), and the amount of each element (mass %) is calculated from the X-ray spectrum peaks thus obtained. The amount of Zr at the central part of the particle cross-section thus obtained is designated as "Zr(c)", and the amount of Zr at the surface part of the particle cross-section is designated as "Zr(s)".

Then, the amount of Zr (Zr(c)) at the central part of the particle cross-section and the amount of Zr (Zr(s)) at the surface part of the particle cross-section obtained by an EDX analysis are substituted into the above-mentioned Formula (1), and thereby the dispersion degree of Zr in the ferrite particle to be analyzed can be obtained.

At this time, with regard to the amount of Zr at the surface part of the particle cross-section, four regions surrounded by rectangle R1, rectangle R2, which is defined similarly, and rectangle R3 and rectangle R4, which are defined based on points Q and Q' defined similarly to the points P and P' with respect to straight line Dy that is orthogonal to straight line Dx passing through the center C of the particle cross-section, are defined as the surface part, and the average value of the amounts of Zr in the respective regions was used. The respective rectangles R1, R2, R3, and R4 were disposed at an approximately equal interval along the contour of the particle cross-section.

2. Evaluation Results

The measurement results for the respective evaluation items are shown in Table 2. Incidentally, the XRD analysis value in Table 2 represents the content (mass %) of the perovskite crystal phase component obtained by subjecting the powder X-ray diffraction pattern to Rietveld analysis. Furthermore, in the column of the resistance value H in Table 2, B.D. means that the resistance value is less than $2.5 \times 10^6$, which is the measurement lower limit of the electrometer.

(1) Content of Perovskite Crystal Phase Component and Dispersion Degree of Zr Element As shown in Table 2, regarding the ferrite particles of Example 1 to Example 11, it was verified that ferrite particles containing 0.22% by mass to 2.48% by mass of the perovskite crystal phase component represented by the compositional formula: $RZrO_3$ can be obtained by using an oxide containing an alkaline earth metal element (R) and zirconium dioxide as raw materials. Furthermore, since the dispersion degrees of Zr in the ferrite particles of Example 1 to Example 11 had values as small as 1.0 to 1.2, it was verified that the perovskite crystal phase component was satisfactorily dispersed in the ferrite particles. The ferrite particles of Example 3 and Example 5, which had smaller blending quantities of the alkaline earth metal element (R) with respect to zirconium dioxide as compared to other Examples, or the ferrite particle of Example 4, which had a larger blending quantity of the alkaline earth metal element (R) with respect to zirconium dioxide, had smaller contents of the perovskite crystal phase component as compared to other Examples, and the ferrite particles of Example 3 and Example 5 also had higher dispersion degrees of Zr as compared to other Examples.

On the other hand, in the production methods of Comparative Example 1 to Comparative Example 8, ferrite particles containing the perovskite crystal phase component could not be obtained. Furthermore, in the production method of Comparative Example 9, a ferrite particle containing the perovskite crystal phase component could be obtained; however, the content thereof was extremely small. In Comparative Example 1 and Comparative Example 4 to Comparative Example 7, only either an oxide containing an alkaline earth metal element (R) or zirconium dioxide was used as the raw material. In that case, it was verified that ferrite particles containing the perovskite crystal phase component could not be obtained. On the other hand, in Comparative Example 2, Comparative Example 3, Comparative Example 8, and Comparative Example 9, an oxide containing an alkaline earth metal element (R) and zirconium oxide were used as the raw materials. However, it is speculated that in these Comparative Examples, since the blending quantity of zirconium dioxide was a very small amount such as 0.05 with respect to 100 of the main component raw materials in a molar ratio, in Comparative Example 2, Comparative Example 3 and Comparative Example 8, the perovskite crystal phase component was not produced. On the other hand, it is speculated that in Comparative Example 9, since the sintering temperature was set to 1,360° C., the perovskite crystal phase component was produced, even though the amount was very small.

(2) Apparent Density, BET Specific Surface Area and Particle Strength Index

As shown in Table 2, the apparent density of the ferrite particles of Example 1 to Example 11 was in the range of 1.90 g/cm$^3$ to 2.43 g/cm$^3$. The apparent density of the ferrite particles of Comparative Example 1 to Comparative Example 9 was in the range of 1.73 g/cm$^3$ to 2.47 g/cm$^3$, which fell in the range defined in the present invention, except for Comparative Example 8. Furthermore, the BET specific surface area of the ferrite particles of Example 1 to Example 11 was in the range of 0.085 m$^2$/g to 0.530 m$^2$/g. The BET specific surface area of the ferrite particles of Comparative Example 1 to Comparative Example 9 was in the range of 0.055 m$^2$/g to 0.599 m$^2$/g, which fell in the range defined in the present invention, except for Comparative Example 9. As such, it can be said that the apparent density and the BET specific surface area of the ferrite particles of Examples and the ferrite particles of Comparative Examples exhibited comparable values. However, in view of the particle strength index, while the ferrite particles of Example 1 to Example 11 had values of 0.4 to 1.3, the ferrite particles of Comparative Example 1 to Comparative Example 9 had values of 1.5 to 5.6, and it was verified that the particle strength indices of the ferrite particles of the Comparative Examples had larger values compared to the particle strength indices of the ferrite particles of the Examples, and the ferrite particles according to the present invention had higher particle strength. Therefore, it was verified that since the ferrite particles according to the present invention contain the perovskite crystal phase component inside the particles, structural defects can be suppressed for the reasons as those described earlier, and ferrite particles that have high particle strength and are not likely to have cracking and chipping can be obtained while the surface characteristics of the particles are maintained in a range preferable for performing electrophotographic printing.

Furthermore, with regard to the apparent density and the BET specific surface area, the ferrite particles of Example 1 to Example 9 satisfy the relationship represented by the above-mentioned formula: $(-0.892X+2.34 \leq Y \leq -0.892X+2.49)$. On the other hand, the ferrite particles of Example 10 and Example 11 did not satisfy this relationship. It is speculated that as the apparent density and the BET specific surface area satisfy a predetermined relationship, cracking and chipping can be further reduced when stress is applied, for the above-mentioned reasons or the like.

(3) Saturation Magnetization and Resistance Value

Next, the saturation magnetization and the resistance value will be examined. The ferrite particle of Example 1 and the ferrite particles of Comparative Example 1 and Comparative Example 2 had the same blending quantities of the other raw materials, except for the blending quantity of ZrO$_2$. However, the ferrite particle of Example 1 had higher magnetization and high logarithmic values of the resistance value L and resistance value H, compared to the ferrite particles of Comparative Example 1 and Comparative Example 2. From this, it is conceived that even with ferrite particles having approximately similar composition, by producing a perovskite crystal phase component represented by the compositional formula: RZrO$_3$ at the grain boundaries, the content of unreacted raw materials is reduced, the occurrence of structural defects can be reduced, and ferrite particles having higher magnetization can be obtained. Furthermore, it is conceived that that by producing the perovskite crystal phase component at the grain boundaries, increase in the resistance of the ferrite particles can be promoted due to the various factors above-mentioned.

Then, since the ferrite particles of Example 1 to Example 11 all contain the perovskite crystal phase component, the environmental variation ratio of resistance (log L/log H) is in the range of 1.04 to 1.14, and the environmental dependency of resistance is suppressed to a low level. In addition, since the ferrite particles of Example 1 to Example 11 have high strength and are not likely to have cracking and chipping when subjected to mechanical stress, carrier scattering associated with the generation of fine powder can be suppressed. Therefore, in the electrophotographic developers produced by using the ferrite particles of Example 1 to Example 11, the quantity of carrier scattering was small such as 2 pieces to 9 pieces, and it was verified that carrier scattering can be satisfactorily suppressed even in a high-temperature and high-humidity environment. On the other hand, in the electrophotographic developers produced by using the ferrite particles of Comparative Example 1 to Comparative Example 9, which did not contain the perovskite crystal phase component, the environmental variation ratio of resistance could not be calculated or was large such as 1.20 to 1.36, and environmental dependency of resistance was observed. As a result, in the electrophotographic developers produced by using the ferrite particles of Comparative Example 1 to Comparative Example 9, the quantity of carrier scattering was 11 pieces to 21 pieces, and it was verified that carrier scattering is likely to occur in a high-temperature and high-humidity environment.

TABLE 1

| | | Blending quantity of raw materials (molar ratio) | | | | | Sintering temperature (° C.) | Oxygen concentration (volume %) | Oxidation treatment (° C.) |
| --- | --- | --- | --- | --- | --- | --- | --- | --- | --- |
| | | Fe$_2$O$_3$ | MnO | MgO | ZrO$_2$ | R (alkaline earth metal element) | | | |
| | | | | | | Type | Blending quantity | | | |
| Example | 1 | 51.3 | 38.3 | 10.4 | 1.00 | SrO | 0.80 | 1,250 | 0 | 540 |
| | 2 | 51.3 | 38.3 | 10.4 | 1.00 | SrO | 3.00 | 1,280 | 0 | 540 |
| | 3 | 51.3 | 38.3 | 10.4 | 1.00 | SrO | 0.10 | 1,215 | 0 | 540 |
| | 4 | 51.3 | 38.3 | 10.4 | 0.10 | SrO | 3.00 | 1,230 | 0 | 540 |
| | 5 | 51.3 | 38.3 | 10.4 | 3.00 | SrO | 0.10 | 1,270 | 0 | 540 |
| | 6 | 51.3 | 38.3 | 10.4 | 3.00 | SrO | 3.00 | 1,320 | 0 | 540 |
| | 7 | 51.3 | 38.3 | 10.4 | 1.00 | SrO | 0.80 | 1,210 | 1.3 | None |
| | 8 | 51.3 | 38.3 | 10.4 | 1.20 | SrO | 0.80 | 1,215 | 0 | 540 |

TABLE 1-continued

| | | Blending quantity of raw materials (molar ratio) | | | | | Sintering | Oxygen | Oxidation |
| | | | | | | R (alkaline earth metal element) | | | |
| | | Fe$_2$O$_3$ | MnO | MgO | ZrO$_2$ | Type | Blending quantity | temperature (° C.) | concentration (volume %) | treatment (° C.) |
|---|---|---|---|---|---|---|---|---|---|---|
| | 9 | 51.3 | 38.3 | 10.4 | 0.80 | SrO | 0.80 | 1,250 | 0 | 540 |
| | 10 | 51.3 | 38.3 | 10.4 | 1.00 | SrO | 0.80 | 1,200 | 0 | 540 |
| | 11 | 51.3 | 38.3 | 10.4 | 1.00 | SrO | 0.80 | 1,300 | 0 | 540 |
| Comparative | 1 | 51.3 | 38.3 | 10.4 | 0.00 | SrO | 0.80 | 1,200 | 0 | 540 |
| Example | 2 | 51.3 | 38.3 | 10.4 | 0.05 | SrO | 0.80 | 1,200 | 0 | 540 |
| | 3 | 51.3 | 38.3 | 10.4 | 0.05 | SrO | 0.05 | 1,200 | 0 | 540 |
| | 4 | 51.3 | 38.3 | 10.4 | 1.00 | SrO | 0.00 | 1,200 | 0 | 540 |
| | 5 | 51.3 | 38.3 | 10.4 | 3.00 | SrO | 0.00 | 1,250 | 0 | 540 |
| | 6 | 51.3 | 38.3 | 10.4 | 0.00 | CaO | 0.80 | 1,200 | 0 | 540 |
| | 7 | 51.3 | 38.3 | 10.4 | 0.00 (TiO$_2$ 0.80) | SrO | 0.80 | 1,200 | 0 | 540 |
| | 8 | 51.3 | 38.3 | 10.4 | 0.05 | SrO | 0.05 | 1,100 | 0 | 540 |
| | 9 | 51.3 | 38.3 | 10.4 | 0.05 | SrO | 0.05 | 1,360 | 0 | 540 |

TABLE 2

| | | Perovskite crystal phase component (mass %) | Dispersion degree of Zr element | Volume average particle size D$_{50}$ (μm) | Saturation magnetization (emu/g) | Logarithmic value log L of resistance value L (logΩ) | Logarithmic value log H of resistance value H (logΩ) |
|---|---|---|---|---|---|---|---|
| Example | 1 | 0.95 | 1.0 | 32.2 | 60.5 | 8.3 | 7.8 |
| | 2 | 1.12 | 1.1 | 33.1 | 57.2 | 8.1 | 7.5 |
| | 3 | 0.22 | 1.2 | 32.6 | 59.1 | 8.1 | 7.4 |
| | 4 | 0.26 | 1.0 | 32.7 | 56.1 | 7.6 | 7.0 |
| | 5 | 0.23 | 1.2 | 32.6 | 56.4 | 8.8 | 7.7 |
| | 6 | 2.48 | 1.0 | 33.4 | 55.2 | 8.8 | 8.3 |
| | 7 | 0.94 | 1.0 | 32.1 | 58.4 | 8.3 | 7.7 |
| | 8 | 1.02 | 1.0 | 33.6 | 57.4 | 8.5 | 7.8 |
| | 9 | 0.78 | 1.0 | 34.1 | 58.1 | 8.0 | 7.5 |
| | 10 | 0.91 | 1.0 | 32.6 | 58.3 | 8.3 | 7.7 |
| | 11 | 1.00 | 1.0 | 34.6 | 61.2 | 8.3 | 8.0 |
| Comp. Example | 1 | 0.00 | — | 32.3 | 56.5 | 7.5 | B.D. |
| | 2 | 0.00 | 1.0 | 32.5 | 57.3 | 7.7 | 6.4 |
| | 3 | 0.00 | 1.0 | 33.1 | 57.1 | 7.7 | B.D. |
| | 4 | 0.00 | 1.4 | 32.9 | 57.5 | 8.3 | 6.7 |
| | 5 | 0.00 | 1.4 | 32.8 | 57.5 | 9.1 | 6.7 |
| | 6 | 0.00 | — | 32.1 | 56.2 | 7.7 | 6.4 |
| | 7 | 0.00 | — | 33.0 | 56.3 | 7.9 | 6.4 |
| | 8 | 0.00 | 1.2 | 32.3 | 55.1 | 7.0 | B.D. |
| | 9 | 0.01 | 1.3 | 35.3 | 57.3 | 7.8 | 6.5 |

| | | Environmental variation ratio (log L/log H) | BET specific surface area (m$^2$/g) | Apparent density (g/cm$^3$) | Particle strength index | Quantity of carrier scattering (pieces) |
|---|---|---|---|---|---|---|
| Example | 1 | 1.06 | 0.160 | 2.28 | 0.5 | 3 |
| | 2 | 1.08 | 0.156 | 2.28 | 0.4 | 6 |
| | 3 | 1.09 | 0.163 | 2.27 | 0.5 | 5 |
| | 4 | 1.09 | 0.172 | 2.19 | 0.6 | 7 |
| | 5 | 1.14 | 0.197 | 2.18 | 0.8 | 4 |
| | 6 | 1.06 | 0.186 | 2.29 | 0.6 | 2 |
| | 7 | 1.08 | 0.171 | 2.26 | 0.9 | 4 |
| | 8 | 1.09 | 0.530 | 1.92 | 1.1 | 7 |
| | 9 | 1.07 | 0.094 | 2.39 | 1.1 | 7 |
| | 10 | 1.08 | 0.443 | 1.90 | 1.3 | 9 |
| | 11 | 1.04 | 0.085 | 2.43 | 1.3 | 8 |
| Comp. Example | 1 | — | 0.125 | 2.14 | 1.5 | 17 |
| | 2 | 1.20 | 0.102 | 2.16 | 1.6 | 13 |
| | 3 | — | 0.103 | 2.19 | 2.1 | 19 |
| | 4 | 1.24 | 0.188 | 2.23 | 1.6 | 11 |
| | 5 | 1.36 | 0.175 | 2.24 | 1.5 | 12 |
| | 6 | 1.20 | 0.096 | 2.20 | 1.8 | 14 |

TABLE 2-continued

| | | | | | |
|---|---|---|---|---|---|
| 7 | 1.23 | 0.113 | 2.19 | 1.5 | 17 |
| 8 | — | 0.599 | 1.73 | 5.6 | 21 |
| 9 | 1.20 | 0.055 | 2.47 | 3.2 | 16 |

INDUSTRIAL APPLICABILITY

The ferrite particle according to the present invention has high strength and low environmental dependency of resistance. Therefore, by using the ferrite particle as a carrier core material, less cracking and chipping occur, and the occurrence of carrier scattering can be suppressed even in a high-temperature and high-humidity environment. Therefore, a developer having a long service life as compared to conventional ones can be obtained, and since carriers can be suppressed from adhering to a photoreceptor and a fixing roller and damaging these, prolongation of service life of an electrophotographic developing apparatus can be promoted.

The invention claimed is:

1. A ferrite particle, comprising a crystal phase component comprising a perovskite crystal represented by the compositional formula: $RZrO_3$, wherein R represents an alkaline earth metal element, and having an apparent density in a range represented by the following formula:

$$1.90 \leq Y \leq 2.45$$

provided that Y in the formula is the apparent density ($g/cm^3$) of the ferrite particle, wherein the ferrite particle contains 0.1 mol % or more and 3.0 mol % or less of zirconium and wherein the perovskite crystal constitutes 0.05% by mass or more and 2.50% by mass or less of a crystal phase constituting the ferrite particle is determined by a Rietveld analysis of an X-ray diffraction pattern.

2. The ferrite particle according to claim 1, having a BET specific surface area in a range represented by the following formula:

$$0.08 \leq X \leq 0.550$$

provided that X in the formula is the BET specific surface area ($m^2/g$) of the ferrite particle.

3. The ferrite particle according to claim 2, wherein the apparent density and the BET specific surface area satisfy the following relational formula:

$$-0.892X + 2.34 \leq Y \leq -0.892X + 2.49.$$

4. The ferrite particle according to claim 1, wherein R is at least one element selected from the group consisting of Sr, Ca, and Ba.

5. The ferrite particle according to claim 1, comprising a crystal phase component comprising a spinel crystal represented by the compositional formula: $(MO)a(Fe_2O_3)b$, wherein M represents at least one metal element selected from the group consisting of Fe, Mg, Mn, Cu, Zn, and Ni, and a+b=100 (mol %), as a main component.

6. The ferrite particle according to claim 1, wherein the ferrite particle comprises a crystal phase component comprising a spinel crystal represented by the compositional formula: $(MnO)x(MgO)y(Fe_2O_3)z$, wherein $15 \leq x \leq 50$, $2 \leq y \leq 35$, $45 \leq z \leq 60$, x+y+z=100 (mol %), as a main component.

7. An electrophotographic developer carrier core material, comprising the ferrite particle described in claim 1.

8. An electrophotographic developer carrier, comprising the ferrite particle described in claim 1 and a resin coating layer provided on a surface of the ferrite particle.

9. An electrophotographic developer, comprising the electrophotographic developer carrier described in claim 8 and a toner.

10. The electrophotographic developer according to claim 9, used as a replenishment developer.

* * * * *